US012659791B2

(12) United States Patent
Yu et al.

(10) Patent No.: US 12,659,791 B2
(45) Date of Patent: Jun. 16, 2026

(54) COMMUNICATION METHOD AND APPARATUS

(71) Applicant: HUAWEI TECHNOLOGIES CO., LTD., Shenzhen (CN)

(72) Inventors: Chang Yu, Shenzhen (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 18/304,628

(22) Filed: Apr. 21, 2023

(65) Prior Publication Data

US 2023/0262513 A1      Aug. 17, 2023

Related U.S. Application Data

(63) Continuation of application No. PCT/CN2020/123448, filed on Oct. 23, 2020.

(51) Int. Cl.
*H04W 28/02*          (2009.01)
*H04W 88/04*          (2009.01)

(52) U.S. Cl.
CPC ........ *H04W 28/0268* (2013.01); *H04W 88/04* (2013.01)

(58) Field of Classification Search
CPC ............. H04W 28/0268; H04W 88/04; H04W 28/0875; H04W 28/0967; H04W 28/0975; H04W 72/02; H04W 72/40; H04W 76/14
See application file for complete search history.

(56) References Cited

U.S. PATENT DOCUMENTS

| | | | |
|---|---|---|---|
| 2018/0279319 A1* | 9/2018 | Yu ......................... | H04W 40/12 |
| 2021/0289391 A1* | 9/2021 | Paladugu .............. | H04W 88/04 |
| 2023/0013067 A1* | 1/2023 | Liu ....................... | H04W 28/24 |

(Continued)

FOREIGN PATENT DOCUMENTS

| | | |
|---|---|---|
| CN | 110830951 A | 2/2020 |
| WO | 2020030177 A1 | 2/2020 |
| WO | 2020034428 A1 | 2/2020 |

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 15), 3GPP TS 36.304 V15.7.0 (Sep. 2020), Technical Specification, total 55 pages.

(Continued)

*Primary Examiner* — Abdullahi Ahmed
(74) *Attorney, Agent, or Firm* — HAUPTMAN HAM, LLP

(57)          ABSTRACT
A communication method and apparatus. A sidelink resource is determined that meets a quality of service requirement of to-be-transmitted data to improve data transmission efficiency in a 4G system, a 5G system, and/or a future communication system, for example, a 6G system. A first terminal device receives delay information, determines a first packet delay budget, and determines a resource for transmitting data on a sidelink. The delay information indicates a packet delay budget that data transmission is to meet, the first packet delay budget is a packet delay budget that is to be met in response to data being transmitted on the sidelink, and the sidelink is a link for transmitting data between the first terminal device and a second terminal device.

20 Claims, 5 Drawing Sheets

(56) References Cited

U.S. PATENT DOCUMENTS

| | | | |
|---|---|---|---|
| 2023/0171645 A1* | 6/2023 | Wang ................ | H04W 28/0268 |
| | | | 455/11.1 |
| 2023/0262793 A1* | 8/2023 | Deng ................... | H04W 76/14 |
| | | | 370/329 |
| 2023/0309066 A1* | 9/2023 | Ganesan ............... | H04W 72/02 |
| 2024/0155460 A1* | 5/2024 | Back .................... | H04W 40/12 |

OTHER PUBLICATIONS

3rd Generation Partnership Project; Technical Specification Group Radio Access Network; NR; User Equipment (UE) procedures in Idle mode and RRC Inactive state (Release 16), 3GPP TS 38.304 V16.2.0 (Sep. 2020), Technical Specification, total 39 pages.
Chinese Office Action issued in corresponding Chinese Application No. 202080105822.X, dated Mar. 28, 2024, pp. 1-17.
Dawid Koziol et al:"QoS and Service Continuiy in 3GPP D2D for IoT and Wearables,"2017 IEEE Conference on Standards for Communications and Networking(CSCN), Sep. 18-20, 2017. total 7 pages.
Catt et al:"Introducing new V2X service type."S2-2005912, SA WG2 Meeting #S2-140E, Aug. 19-Sep. 1, 2020, Elbonia. total 9 pages.
Extended European Search Report issued in corresponding European Application No. 20958380.6, dated Oct. 19, 2023, pp. 1-13.

* cited by examiner

COMMUNICATION METHOD AND APPARATUS

CROSS-REFERENCE TO RELATED APPLICATIONS

This application is a continuation of International Application No. PCT/CN2020/123448, filed on Oct. 23, 2020, the disclosure of which is hereby incorporated by reference in its entirety.

BACKGROUND

In a long term evolution (long term evolution, LTE) system, in response to a first terminal device communicating with a second terminal device through a sidelink (sidelink, SL), a resource is selected based on a proximity-based services per-packet priority (proximity-based services per-packet priority, PPPP) value. For example, a logical channel corresponding to the sidelink is associated with the PPPP value. For example, the PPPP value ranges from 1 to 8; and the PPPP value indicates a priority (a smaller value indicates a higher priority) of data carried on the logical channel, and further indicate a delay requirement of to-be-transmitted data. Therefore, the first terminal device and the second terminal device selects, based on the PPPP value, a resource that meets the delay requirement of the to-be-transmitted data.

In a new radio (new radio, NR) system, although a priority value is associated with a logical channel corresponding to a sidelink, the priority value does not reflect a delay requirement of to-be-transmitted data, and the priority value is different from the PPPP value in the LTE system. Therefore, in the NR system, how a terminal device determines a resource that meets the delay requirement of the to-be-transmitted data on the sidelink is a problem that is to be resolved.

SUMMARY

Embodiments described herein provide a communication method and apparatus, to determine a sidelink resource that meets a delay requirement of to-be-transmitted data. This ensures a quality of service requirement of data transmission, and improves data transmission efficiency.

To achieve the foregoing objective, the following technical solutions are used in at least one embodiment. According to a first aspect, a communication method is provided. The communication method includes: A first terminal device receives delay information, determines a first packet delay budget, and determines a resource for transmitting data on a sidelink. The delay information indicates a packet delay budget that data transmission is to meet, the first packet delay budget is a packet delay budget that is to be met in response to data being transmitted on the sidelink, and the sidelink is a link for transmitting data between the first terminal device and a second terminal device.

According to the communication method in the first aspect, the first terminal device determines, based on the received delay information, the first packet delay budget that is to be met in response to data being transmitted on the sidelink, and further determines, based on the first packet delay budget, a sidelink resource that meets a delay requirement of to-be-transmitted data. This ensures a quality of service requirement of data transmission, and improves data transmission efficiency.

In at least one embodiment, the delay information includes first delay information, and the first delay information includes the packet delay budget that is to be met in response to data being transmitted on the sidelink.

Optionally, the first delay information corresponds to a QoS profile of a quality of service (quality of service, QoS) flow (flow) transmitted on the sidelink, a QoS parameter corresponding to the QoS profile includes a 5QI, and the 5QI corresponds to a packet delay budget (packet delay budget, PDB). Therefore, the QoS profile may indicate a packet delay budget that is to be met in response to data being transmitted on the sidelink.

In at least one embodiment, the delay information includes second delay information, the second delay information includes a packet delay budget that is to be met in response to data being transmitted on a first link, the first link is a link for transmitting data between a relay terminal device and a network device, and the relay terminal device is the first terminal device or the second terminal device. Optionally, the relay terminal device directly performs data transmission with the network device.

Optionally, the second delay information corresponds to a QoS profile of a QoS flow transmitted on the first link, a QoS parameter corresponding to the QoS profile corresponds to a 5QI, and the 5QI corresponds to a packet delay budget PDB. Therefore, the QoS profile indicates a packet delay budget that is to be met in response to data being transmitted on the first link.

In at least one embodiment, the delay information includes third delay information, the third delay information includes a packet delay budget corresponding to a first quality of service flow, the first quality of service flow is a quality of service flow between a remote terminal device and the network device, and the remote terminal device is the first terminal device or the second terminal device.

Optionally, the remote terminal device cannot directly communicate with the network device, and is to perform data transmission with the network device by using the relay terminal device. The first terminal device serves as a remote terminal device or a relay terminal device.

Optionally, the third delay information corresponds to a QoS profile of the first quality of service flow, a QoS parameter corresponding to the QoS profile includes a 5QI, and the 5QI corresponds to a packet delay budget PDB. Therefore, the QoS profile indicates a packet delay budget of the first QoS flow.

In at least one embodiment, that a first terminal device determines a first packet delay budget includes: The first terminal device determines the first packet delay budget based on the first delay information. For example, the first terminal device uses a value of the PDB in the first delay information as the first packet delay budget, to determine, based on the first packet delay budget, a sidelink resource that meets a quality of service requirement of the to-be-transmitted data.

In at least one embodiment, that a first terminal device determines a first packet delay budget includes: The first terminal device determines the first packet delay budget based on the second delay information and the third delay information. The second delay information includes the packet delay budget that is to be met in response to data being transmitted on the first link, and the first link is a link for transmitting data between the first terminal device and the network device. For example, the first terminal device uses a difference between a value of a PDB in the third delay information and a value of a PDB in the second delay information as the first packet delay budget, to determine, based on the first packet delay budget, the sidelink resource that meets the quality of service requirement of the to-be-transmitted data.

In at least one embodiment, the communication method in the first aspect may further include: The first terminal device sends first indication information to the network device. The first indication information indicates a second packet delay budget of data transmitted on the sidelink.

For example, in response to the first terminal device not determining a resource that meets the first packet delay budget, the first terminal device may send the first indication information to the network device, to indicate the second packet delay budget, in a resource pool, that actually is met in response to data being transmitted on the sidelink, so that the network device re-determines the delay information, and/or reallocates a resource. Therefore, the first terminal device and/or the network device determine/determines a more appropriate sidelink resource, to meet an end-to-end data transmission delay requirement between the remote device and the network device.

In at least one embodiment, the communication method in the first aspect may further include: The first terminal device sends first indication information to the second terminal device. The first indication information indicates a second packet delay budget of data transmitted on the sidelink.

For example, in response to the first terminal device not determining a resource that meets the first packet delay budget, the first terminal device sends the first indication information to the second terminal device, to indicate the second packet delay budget, in a resource pool, that actually is met in response to data being transmitted on the sidelink, so that the second terminal device sends the second packet delay budget to the network device, and the network device re-determines the delay information, and/or reallocates a resource. Therefore, the first terminal device determines a more appropriate sidelink resource.

For example, in response to the first terminal device not determining a resource that meets the first packet delay budget, the first terminal device sends the first indication information to the second terminal, to indicate the second packet delay budget, in a resource pool, that actually is met in response to data being transmitted on the sidelink, so that the second terminal device determines a packet delay budget that the first link is to meet, and sends the packet delay budget to the network device, and the network device re-determines the delay information, and/or allocates a resource. Therefore, the first terminal device determines a more appropriate sidelink resource, or allocates a first link resource to the second terminal device, so that transmission between the second terminal device and the network device meets the third delay information.

In at least one embodiment, the communication method in the first aspect further includes: The first terminal device sends second indication information to the second terminal device. The second indication information indicates a third packet delay budget of data transmitted on the first link.

For example, in response to the first terminal device not determining a resource that meets the first packet delay budget, the first terminal device sends, to the second terminal device, the third packet delay budget of data transmitted on the first link, so that the second terminal device sends the third packet delay budget to the network device. The network device re-determines the delay information, or allocates, to the second terminal device, a resource that meets the third packet delay budget. The resource is used by the second terminal device to transmit data on the first link, and/or the network device reconfigures a link resource, for example, a data radio bearer (data radio bearer, DRB), a mapping relationship between a QoS flow and a DRB, establishing a new protocol data unit (protocol data unit, PDU) session, and/or establishing a new QoS flow.

In at least one embodiment, that a first terminal device receives delay information includes: The first terminal device receives a radio resource control reconfiguration message from the network device. The radio resource control reconfiguration message includes the delay information. Therefore, the first terminal device receives the delay information, to determine the first packet delay budget, and further determines, based on the first packet delay budget, the sidelink resource that meets the quality of service requirement of the to-be-transmitted data.

In at least one embodiment, that a first terminal device receives delay information includes: The first terminal device receives a radio resource control reconfiguration message from the network device. The radio resource control reconfiguration message includes bearer configuration and/or logical channel configuration, and the bearer configuration and/or logical channel configuration includes one or more pieces of delay information. Therefore, the first terminal device receives the delay information, to determine the first packet delay budget corresponding to the bearer/logical channel, and further determines, based on the first packet delay budget, the sidelink resource that meets the quality of service requirement of the to-be-transmitted data.

In at least one embodiment, that a first terminal device receives delay information includes: The first terminal device receives one or more of the following from the network device or the second terminal device: a media access control MAC sub-protocol data unit (sub-protocol data unit, subPDU), a MAC service data unit (service data unit, SDU), a MAC protocol data unit PDU, a MAC control element (control element, CE), padding (padding), and a header of an adaptation relay protocol layer. The MAC subPDU, the MAC SDU, the MAC PDU, the MAC CE, the padding, and/or the header of the adaptation relay protocol layer includes the delay information. Therefore, the first terminal device receives the packet delay budget that is dynamically indicated by the network device and that is to be met in response to data is transmitted on the sidelink, so that the first terminal device can select or request a more appropriate resource for transmitting data on the sidelink.

In at least one embodiment, the communication method in the first aspect further includes: The first terminal device receives a radio resource control message from the second terminal device. The radio resource control message includes the delay information. For example, the delay information received by the first terminal device is forwarded by the second terminal device.

In at least one embodiment, that a first terminal device receives delay information includes: The first terminal device receives the radio resource control message from the second terminal device. The radio resource control message includes bearer configuration and/or logical channel configuration, and the bearer configuration and/or logical channel configuration includes one or more pieces of delay information. Therefore, the first terminal device receives the delay information, to determine the first packet delay budget corresponding to the bearer/logical channel, and further determines, based on the first packet delay budget, the sidelink resource that meets the quality of service requirement of the to-be-transmitted data.

In at least one embodiment, the communication method in the first aspect further includes: The first terminal device sends one or more of the following to the second terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the third packet delay budget of data transmitted on the first link.

For example, in response to the first terminal device not determining a resource that meets the first packet delay budget, the first terminal device sends the third packet delay budget of data transmitted on the first link to the second terminal device, so that the second terminal device sends the third packet delay budget to the network device, and the network device re-determines the delay information. Therefore, the first terminal device determines a more appropriate sidelink resource.

According to a second aspect, a communication method is provided. The communication method includes: A second terminal device receives delay information from a network device, and sends the delay information to a first terminal device. The delay information indicates a packet delay budget that data transmission is to meet.

In at least one embodiment, the delay information includes first delay information, and the first delay information includes the packet delay budget that is to be met in response to data being transmitted on a sidelink.

In at least one embodiment, the delay information includes second delay information, the second delay information includes a packet delay budget that is to be met in response to data being transmitted on a first link, the first link is a link for transmitting data between a relay terminal device and the network device, and the relay terminal device is the first terminal device or the second terminal device.

In at least one embodiment, the delay information includes third delay information, the third delay information includes a packet delay budget corresponding to a first quality of service flow, the first quality of service flow is a quality of service flow between a remote terminal device and the network device, and the remote terminal device is the first terminal device or the second terminal device.

In at least one embodiment, the communication method in the second aspect further includes: The second terminal device receives first indication information from the first terminal device. The first indication information indicates a second packet delay budget of data transmitted on the sidelink.

In at least one embodiment, the communication method in the second aspect further includes: The second terminal device sends the first indication information to the network device.

In at least one embodiment, the communication method in the second aspect further includes: The second terminal device receives second indication information from the first terminal device. The second indication information indicates a third packet delay budget of data transmitted on the first link.

In at least one embodiment, the communication method in the second aspect further includes: The second terminal device sends the second indication information to the network device.

In at least one embodiment, that a second terminal device receives delay information from a network device includes: The second terminal device receives a radio resource control reconfiguration message from the network device. The radio resource control reconfiguration message includes the delay information, and the delay information indicates a packet delay budget that data transmission is to meet.

In at least one embodiment, that a second terminal device receives delay information from a network device includes: The second terminal device receives a radio resource control reconfiguration message from the network device. The radio resource control reconfiguration message includes bearer configuration and/or logical channel configuration, and the bearer configuration and/or logical channel configuration includes one or more pieces of delay information.

In at least one embodiment, that a second terminal device sends the delay information to a first terminal device includes: The second terminal device sends a radio resource control message to the first terminal device. The radio resource control message includes the delay information.

In at least one embodiment, that a second terminal device sends the delay information to a first terminal device includes: The second terminal device sends a radio resource control message to the first terminal device. The radio resource control reconfiguration message includes bearer configuration and/or logical channel configuration, and the bearer configuration and/or logical channel configuration includes one or more pieces of delay information.

In at least one embodiment, the communication method in the second aspect further includes: The second terminal device receives one or more of the following from the first terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the third packet delay budget of data transmitted on the first link.

In at least one embodiment, the communication method in the second aspect further includes: The second terminal device sends a buffer status report to the network device. The buffer status report includes the third packet delay budget of data transmitted on the first link.

In addition, for technical effects of the communication method in the second aspect, refer to technical effects of the communication method in any implementation of the first aspect. Details are not described herein again.

According to a third aspect, a communication method is provided. The communication method includes: A network device determines delay information, and sends the delay information to a terminal device. The delay information indicates a packet delay budget that data transmission is to meet, and the terminal device includes a first terminal device and/or a second terminal device.

In at least one embodiment, the delay information includes first delay information, and the first delay information includes the packet delay budget that is to be met in response to data being transmitted on a sidelink.

In at least one embodiment, the first delay information is a fitting value determined by the network device.

In at least one embodiment, the delay information includes second delay information, the second delay information includes a packet delay budget that is to be met in response to data being transmitted on a first link, the first link is a link for transmitting data between a relay terminal device and the network device, and the relay terminal device is the first terminal device or the second terminal device.

In at least one embodiment, the delay information includes third delay information, the third delay information includes a packet delay budget corresponding to a first quality of service flow, the first quality of service flow is a quality of service flow between a remote terminal device and the network device, and the remote terminal device is the first terminal device or the second terminal device.

In at least one embodiment, the communication method in the third aspect further includes: The network device receives first indication information from the terminal device. The first indication information indicates a second packet delay budget of data transmitted on the sidelink.

In at least one embodiment, the communication method in the third aspect further includes: The network device determines the first delay information and/or the second delay information based on the first indication information.

In at least one embodiment, that a network device sends the delay information to a terminal device includes: The network device sends a radio resource control reconfiguration message to the terminal device. The radio resource control reconfiguration message includes the delay information.

In at least one embodiment, that a network device sends the delay information to a terminal device includes: The network device sends a radio resource control reconfiguration message to the terminal device. The radio resource control reconfiguration message includes bearer configuration and/or logical channel configuration, and the bearer configuration and/or logical channel configuration includes one or more pieces of delay information.

In at least one embodiment, that a network device sends the delay information to a terminal device includes: The network device sends one or more of the following to the terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the delay information.

In at least one embodiment, the communication method in the third aspect further includes: The network device receives second indication information from the terminal device. The second indication information indicates a third packet delay budget of data transmitted on the first link.

In at least one embodiment, the communication method in the third aspect further includes: The network device determines the first delay information and/or the second delay information based on the second indication information.

In at least one embodiment, the communication method in the third aspect further includes: The network device receives a buffer status report from the second terminal device. The buffer status report includes the third packet delay budget of data transmitted on the first link.

In addition, for technical effects of the communication method in the third aspect, refer to technical effects of the communication method in any implementation of the first aspect. Details are not described herein again.

According to a fourth aspect, a communication apparatus is provided. The communication apparatus includes a transceiver module and a processing module.

The transceiver module is configured to receive delay information. The delay information indicates a packet delay budget that data transmission is to meet.

The processing module is configured to determine a first packet delay budget. The first packet delay budget is a packet delay budget that is to be met in response to data being transmitted on a sidelink, and the sidelink is a link for transmitting data between the communication apparatus and a second terminal device.

The processing module is further configured to determine a resource for transmitting data on the sidelink.

In at least one embodiment, the delay information includes first delay information, and the first delay information includes the packet delay budget that is to be met in response to data being transmitted on the sidelink.

In at least one embodiment, the delay information includes second delay information, the second delay information includes a packet delay budget that is to be met in response to data being transmitted on a first link, the first link is a link for transmitting data between a relay terminal device and a network device, and the relay terminal device is the communication apparatus or the second terminal device.

In at least one embodiment, the delay information includes third delay information, the third delay information includes a packet delay budget corresponding to a first quality of service flow, the first quality of service flow is a quality of service flow between a remote terminal device and a network device, and the remote terminal device is the communication apparatus or the second terminal device.

In at least one embodiment, the processing module is further configured to determine the first packet delay budget based on the first delay information.

In at least one embodiment, the processing module is further configured to determine the first packet delay budget based on the second delay information and the third delay information. The second delay information includes the packet delay budget that is to be met in response to data being transmitted on the first link, and the first link is a link for transmitting data between the communication apparatus and the network device.

In at least one embodiment, the transceiver module is further configured to send the first indication information to the network device. The first indication information indicates a second packet delay budget of data transmitted on the sidelink.

In at least one embodiment, the transceiver module is further used by the communication apparatus to send first indication information to the second terminal device. The first indication information indicates a second packet delay budget of data transmitted on the sidelink.

In at least one embodiment, the transceiver module is further configured to send second indication information to the second terminal device. The second indication information indicates a third packet delay budget of data transmitted on the first link.

In at least one embodiment, the transceiver module is further configured to receive a radio resource control reconfiguration message from the network device. The radio resource control reconfiguration message includes bearer configuration and/or logical channel configuration, and the bearer configuration and/or logical channel configuration includes one or more pieces of delay information.

In at least one embodiment, the transceiver module is further configured to receive one or more of the following from the network device or the second terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the delay information.

In at least one embodiment, the transceiver module is further configured to receive a radio resource control message from the second terminal device. The radio resource control message includes the delay information.

In at least one embodiment, the transceiver module is further configured to receive a radio resource control message from the second terminal device. The radio resource control message includes bearer configuration and/or logical channel configuration, and the bearer configuration and/or logical channel configuration includes one or more pieces of delay information.

In at least one embodiment, the transceiver module is further configured to send one or more of the following to the second terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the third packet delay budget of data transmitted on the first link.

It should be noted that the transceiver module in the fourth aspect includes a receiving module and a sending module. The receiving module is configured to receive data and/or signaling from the second terminal device and/or the network device. The sending module is configured to send data and/or signaling to the second terminal device and/or the network device. The transceiver module is referred to as a communication module. A specific implementation of the transceiver module is not specifically limited in embodiments described herein.

Optionally, the communication apparatus in the fourth aspect further includes a storage module. The storage module stores a program or instructions. In response to the processing module executing the program or the instructions, the communication apparatus in the fourth aspect performs the method in the first aspect.

It should be noted that the communication apparatus in the fourth aspect is a first terminal device, or is a chip (system) or another part or component that is disposed in a first terminal device. This is not limited in at least one embodiment.

In addition, for technical effects of the communication apparatus in the fourth aspect, refer to technical effects of the communication method in at least one embodiment of the first aspect. Details are not described herein again.

According to a fifth aspect, a communication apparatus is provided. The communication apparatus includes a sending module and a receiving module.

The receiving module is configured to receive delay information from a network device. The delay information indicates a packet delay budget that data transmission is to meet.

The sending module is configured to send the delay information to a first terminal device.

In at least one embodiment, the delay information includes first delay information, and the first delay information includes the packet delay budget that is to be met in response to data being transmitted on a sidelink.

In at least one embodiment, the delay information includes second delay information, the second delay information includes a packet delay budget that is to be met in response to data being transmitted on a first link, the first link is a link for transmitting data between a relay terminal device and the network device, and the relay terminal device is the first terminal device or the communication apparatus.

In at least one embodiment, the delay information includes third delay information, the third delay information includes a packet delay budget corresponding to a first quality of service flow, the first quality of service flow is a quality of service flow between a remote terminal device and the network device, and the remote terminal device is the first terminal device or the communication apparatus.

In at least one embodiment, the receiving module is further configured to receive first indication information from the first terminal device. The first indication information indicates a second packet delay budget of data transmitted on the sidelink.

In at least one embodiment, the sending module is further used by the communication apparatus to send the first indication information to the network device.

In at least one embodiment, the receiving module is further configured to receive second indication information from the first terminal device. The second indication information indicates a third packet delay budget of data transmitted on the first link.

In at least one embodiment, the sending module is further configured to send the second indication information to the network device.

In at least one embodiment, the receiving module is further configured to receive a radio resource control reconfiguration message from the network device. The radio resource control reconfiguration message includes the delay information, and the delay information indicates a packet delay budget that data transmission is to meet.

In at least one embodiment, the receiving module is further configured to receive a radio resource control reconfiguration message from the network device. The radio resource control reconfiguration message includes bearer configuration and/or logical channel configuration, and the bearer configuration and/or logical channel configuration includes one or more pieces of delay information.

In at least one embodiment, the sending module is further configured to send a radio resource control message to the first terminal device. The radio resource control message includes the delay information.

In at least one embodiment, the sending module is further configured to send a radio resource control message to the first terminal device. The radio resource control reconfiguration message includes bearer configuration and/or logical channel configuration, and the bearer configuration and/or logical channel configuration includes one or more pieces of delay information.

In at least one embodiment, the receiving module is further configured to receive one or more of the following from the first terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the third packet delay budget of data transmitted on the first link.

In at least one embodiment, the sending module is further configured to send a buffer status report to the network device. The buffer status report includes the third packet delay budget of data transmitted on the first link.

It should be noted that the receiving module and the sending module is disposed separately, or is integrated into one module, namely, a transceiver module or a communication module. Specific implementations of the receiving module and the sending module are not specifically limited in at least one embodiment.

Optionally, the communication apparatus in the fifth aspect further includes a processing module and a storage module. The storage module stores a program or instructions. In response to the processing module executing the program or the instructions, the communication apparatus in the fifth aspect can perform the method in the second aspect.

The communication apparatus in the fifth aspect is a second terminal device, or is a chip (system) or another part or component that is disposed in a second terminal device. This is not limited in at least one embodiment.

In addition, for technical effects of the communication apparatus in the fifth aspect, refer to technical effects of the communication method in at least one embodiment of the second aspect. Details are not described herein again.

According to a sixth aspect, a communication apparatus is provided. The communication apparatus includes a processing module and a transceiver module.

The processing module is configured to determine delay information. The delay information indicates a packet delay budget that data transmission is to meet.

The transceiver module is configured to send the delay information to a terminal device. The terminal device includes a first terminal device and/or a second terminal device.

In at least one embodiment, the delay information includes first delay information, and the first delay information includes the packet delay budget that is to be met in response to data being transmitted on a sidelink.

In at least one embodiment, the first delay information is a fitting value determined by the communication apparatus.

In at least one embodiment, the delay information includes second delay information, the second delay information includes a packet delay budget that is to be met in response to data being transmitted on a first link, the first link is a link for transmitting data between a relay terminal device and the communication apparatus, and the relay terminal device is the first terminal device or the second terminal device.

In at least one embodiment, the delay information includes third delay information, the third delay information includes a packet delay budget corresponding to a first quality of service flow, the first quality of service flow is a quality of service flow between a remote terminal device and the communication apparatus, and the remote terminal device is the first terminal device or the second terminal device.

In at least one embodiment, the transceiver module is further configured to receive first indication information from the terminal device. The first indication information indicates a second packet delay budget of data transmitted on the sidelink.

In at least one embodiment, the processing module is further configured to determine the first delay information and/or the second delay information based on the first indication information.

In at least one embodiment, the transceiver module is further configured to send a radio resource control reconfiguration message to the terminal device. The radio resource control reconfiguration message includes the delay information.

In at least one embodiment, the transceiver module is further configured to send a radio resource control reconfiguration message to the terminal device. The radio resource control reconfiguration message includes bearer configuration and/or logical channel configuration, and the bearer configuration and/or logical channel configuration includes one or more pieces of delay information.

In at least one embodiment, the transceiver module is further configured to send one or more of the following to the terminal device: a MAC subPDU, a MAC SDU, a MAC PDU, a MAC CE, padding, and a header of an adaptation relay protocol layer. The MAC subPDU, the MAC SDU, the MAC PDU, the MAC CE, the padding, and/or the header of the adaptation relay protocol layer includes the delay information.

In at least one embodiment, the transceiver module is further configured to receive second indication information from the terminal device. The second indication information indicates a third packet delay budget of data transmitted on the first link.

In at least one embodiment, the processing module is further configured to determine the first delay information and/or the second delay information based on the second indication information.

In at least one embodiment, the transceiver module is further configured to receive a buffer status report from the second terminal device. The buffer status report includes the third packet delay budget of data transmitted on the first link.

It should be noted that the transceiver module in the sixth aspect includes a receiving module and a sending module. The receiving module is configured to receive data and/or signaling from the first terminal device and/or the second terminal device. The sending module is configured to send data and/or signaling to the first terminal device and/or the second terminal device. The transceiver module is referred to as a communication module. A specific implementation of the transceiver module is not specifically limited in at least one embodiment.

Optionally, the communication apparatus in the sixth aspect further includes a storage module. The storage module stores a program or instructions. In response to the processing module executing the program or the instructions, the communication apparatus in the sixth aspect performs the method in the third aspect.

It should be noted that the communication apparatus in the sixth aspect is a network device, or is a chip (system) or another part or component that is disposed in a network device. This is not limited in at least one embodiment.

In addition, for technical effects of the communication apparatus in the sixth aspect, refer to technical effects of the communication method in at least one embodiment of the third aspect. Details are not described herein again.

According to a seventh aspect, a communication apparatus is provided. The communication apparatus includes a processor and a memory. The processor is coupled to the memory, and the processor is configured to control the apparatus to implement the communication method in any one of the first aspect to the third aspect.

According to an eighth aspect, a communication system is provided. The system includes a network device and at least two terminal devices.

According to a ninth aspect, a computer-readable storage medium is provided. The computer-readable storage medium includes a computer program or instructions, and in response to the computer program or the instructions being run on a computer, the computer is enabled to perform the communication method in any one of the first aspect to the third aspect.

According to a tenth aspect, a computer program product is provided. The computer program product includes a computer program or instructions, and in response to the computer program or the instructions being run on a computer, the computer is enabled to perform the communication method in any one of the first aspect to the third aspect.

DESCRIPTION OF EMBODIMENTS

The following describes technical solutions of at least one embodiment with reference to the accompanying drawings.

The technical solutions In at least one embodiment described herein are applied to various communication systems, for example, a wireless fidelity (wireless fidelity, Wi-Fi) system, a vehicle-to-everything (vehicle-to-everything, V2X) communication system, a device-to-device (device-to-device, D2D) communication system, an Internet of vehicles communication system, a 4th generation (4th generation, 4G) mobile communication system such as a long term evolution (long term evolution, LTE) system, a worldwide interoperability for microwave access (worldwide interoperability for microwave access, WiMAX) communication system, a 5th generation (5th generation, 5G) mobile communication system such as a new radio (new radio, NR) system, and/or a future communication system such as a 6th generation (6th generation, 6G) mobile communication system.

In at least one embodiment, a system including a plurality of devices, components, modules, and the like to present various aspects, embodiments, or features. It should be understood that each system includes another device, component, module, and the like, and/or does not include all devices, components, modules, and the like described with reference to the accompanying drawings. In addition, combinations of the solutions are able to be used.

In addition, In at least one embodiment, terms such as "for example" and "such as" are used to represent giving an example, an illustration, or description. Any embodiment or design scheme described as an "example" in at least one embodiment should not be explained as being more preferred or having more advantages than another embodiment or design scheme. Specifically, the word "example" is used to present a concept in a specific manner.

In at least one embodiment, "information (information)", "data (data)", "signal (signal)", "message (message)", "channel (channel)", and "signaling (signaling)" is interchangeably used sometimes. It should be noted that meanings expressed by the terms are consistent in response to differences not being emphasized. "Of (of)", "corresponding (corresponding, relevant), and "corresponding (corresponding)" is interchangeably used sometimes. It should be noted that meanings expressed by the terms are consistent in response to differences not being emphasized.

A network architecture and a service scenario described In at least one embodiment, are intended to describe technical solutions In at least one embodiment, more clearly, and do not constitute any limitation on the technical solutions provided In at least one embodiment. A person of ordinary skill in the art knows that with evolution of a network architecture and emergence of a new service scenario, the technical solutions provided In at least one embodiment, are also applicable to a similar technical problem.

Figure 1:
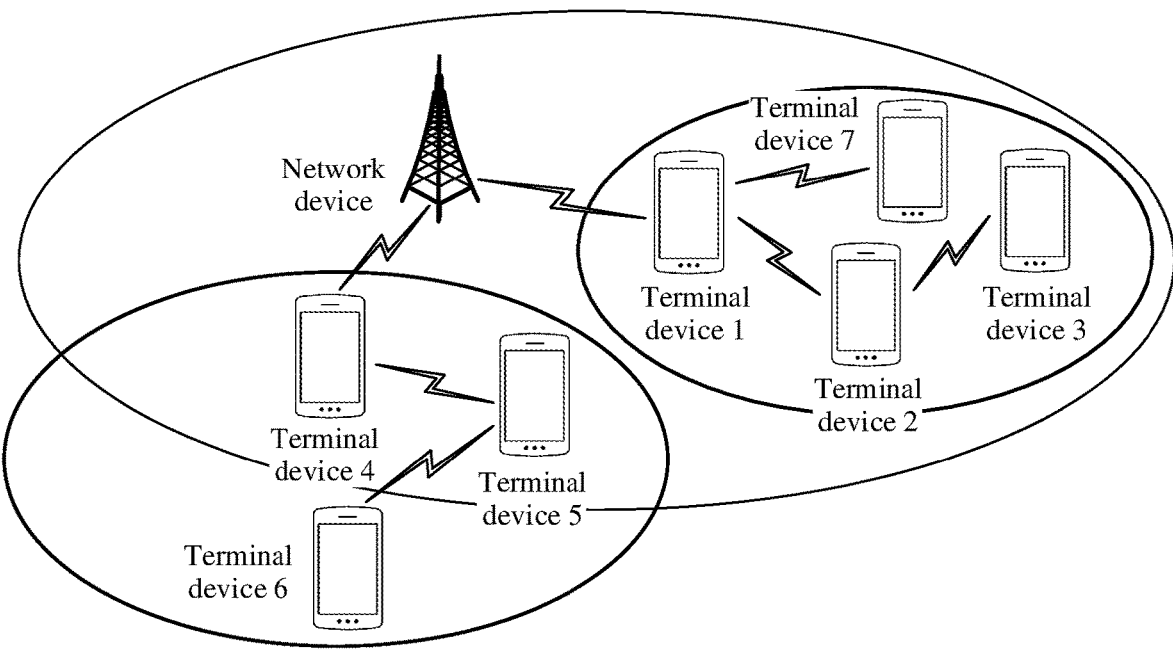
FIG. 1 is a schematic diagram of an architecture of a communication system according to at least one embodiment.

FIG. 1 is a schematic diagram of an architecture of a communication system to which a communication method applies according to at least one embodiment. To better understand embodiments described herein, the following describes in detail a communication system applicable to embodiments described herein by using a communication system shown in FIG. 1 as an example. It should be noted that the solutions In at least one embodiment, is further applied to another mobile communication system, and a corresponding name is replaced with a name of a corresponding function in the another mobile communication system.

As shown in FIG. 1, the communication system includes a network device and at least two terminal devices.

The network device is a device that is located on a network side of the communication system and has a wireless transceiver function, or a chip or a chip system that is disposed in the device. The network device includes but is not limited to an access point (access point, AP) (for example, a home gateway, a router, a server, a switch, or a bridge) in a wireless fidelity (wireless fidelity, Wi-Fi) system, a base station, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless relay node, a wireless backhaul node, or a transmission point (a transmission/reception point, TRP or a transmission point, TP). Alternatively, the network device is a 5G device, for example, a gNB or a transmission point (a TRP or a TP) in a new radio (new radio, NR) system, one antenna panel or a group of antenna panels (including a plurality of antenna panels) of a base station in a 5G system, or a network node constituting a gNB or a transmission point, for example, a baseband unit (BBU), a central unit (central unit, CU), a distributed unit (distributed unit, DU), or a road side unit (road side unit, RSU) with a base station function. The central unit CU includes a control plane (central unit-control plane, CU-CP) and a user plane (central unit-user plane, CU-UP). The network device alternatively is a device including a central unit CU and a distributed unit DU.

The terminal device is a terminal that access the communication system and has a wireless transceiver function, or a chip or a chip system that is disposed in the terminal. The terminal device also is referred to as user equipment (user equipment, UE), a user apparatus, an access terminal, a subscriber unit, a subscriber station, a mobile station (mobile station, MS), a mobile console, a remote station, a remote terminal, a mobile device, a user terminal, a terminal, a wireless communication device, a user agent, or a user apparatus. In at least one embodiment, the terminal device is a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a vehicle-mounted terminal, an RSU having a terminal function, or the like. The terminal device In at least one embodiment, is a built-in or installed vehicle-mounted module, vehicle-mounted module, vehicle-mounted component, vehicle-mounted chip, or vehicle-mounted unit with which a vehicle is equipped and that is used as one or more components or units. For example, the vehicle uses the built-in or installed vehicle-mounted module, vehicle-mounted module, vehicle-mounted component, vehicle-mounted chip, or vehicle-mounted unit to implement the method in at least one embodiment.

In at least one embodiment, the terminal device includes a remote terminal device and a relay terminal device. The relay terminal device directly communicates with the network device. The remote terminal device cannot directly communicate with the network device, and is to communicate with the network device by using the relay terminal device. For example, downlink data that is to be sent by the network device to the remote terminal device is to be forwarded by the relay terminal device to the relay terminal device. Uplink data that is to be sent by the remote terminal device to the network device is to be forwarded by the relay terminal device to the network device.

With reference to FIG. 1, a terminal device 1 and a terminal device 4 is referred to as relay terminal devices, and a terminal device 2, a terminal device 3, a terminal device 5, a terminal device 6, and a terminal device 7 is referred to as remote terminal devices.

It should be noted that the communication method provided In at least one embodiment, is applicable to or assist in communication between the network device and the terminal device shown in FIG. 1 and communication between different terminal devices, for example, between the terminal device 1 and the terminal device 2, between the terminal device 1 and the terminal device 7, between the terminal device 1 and the terminal device 3, between the terminal device 4 and the terminal device 5, and between the terminal device 4 and the terminal device 6.

It should be understood that FIG. 1 is merely a simplified schematic diagram used as an example for ease of understanding. The communication system further includes another network device and/or another terminal device that is not shown in FIG. 1.

Figure 2:
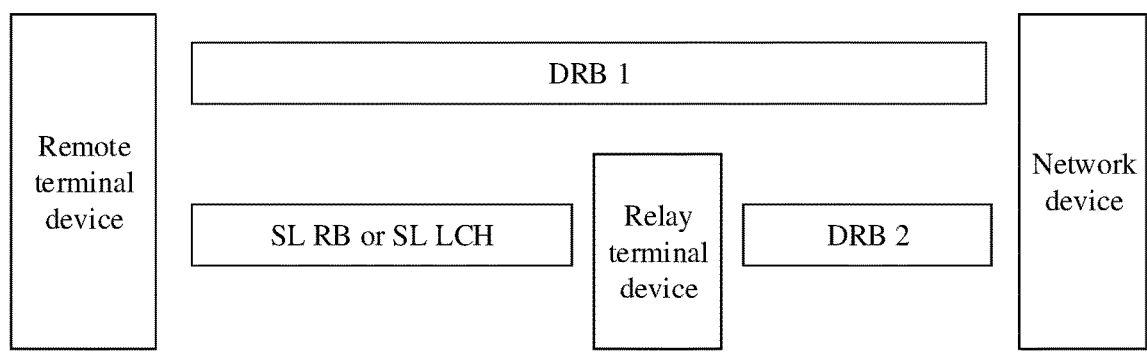
FIG. 2 is a schematic diagram of another architecture of a communication system according to at least one embodiment.

FIG. 2 is a schematic diagram of another architecture of a communication system to which a communication method applies according to at least one embodiment.

As shown in FIG. 2, a data radio bearer DRB 1 is a bearer established between a remote terminal device and a network device. A sidelink (sidelink, SL) radio bearer (radio bearer, RB) is a bearer established between the remote terminal device and a relay terminal device. A DRB 2 is a bearer established between the relay terminal device and the network device.

For example, a quality of service flow (QoS flow) is mapped to an RB. A mapping relationship between the QoS flow and the radio bearer RB is a one-to-one relationship or a many-to-one relationship. The RB includes a signaling radio bearer (signaling radio bearer, SRB) and a DRB. The SRB is used to carry a message, and the DRB is used to carry user plane data.

Specifically, a QoS flow is mapped to the DRB 1, and the remote terminal device and the network device know a mapping relationship between the QoS flow and the DRB 1 in advance. A QoS flow is mapped to the DRB 2. Optionally, the relay terminal device and the network device know a mapping relationship between the QoS flow and the DRB 2 in advance. The DRB 2 is configured to specifically carry uplink or downlink data/signaling between the remote terminal device and the network device, or carry both uplink or downlink data/signaling between the remote terminal device and the network device and uplink or downlink data/signaling between the relay terminal device and the network device.

For example, a QoS parameter corresponding to a QoS profile (profile) of a QoS flow includes a QoS feature identifier, for example, a 5QI. The 5QI corresponds to a resource type, a priority, a packet delay budget (packet delay budget, PDB), or the like; and the 5QI is used to identify a first QoS flow feature. For a same 5QI, a PDB value of uplink transmission is the same as a PDB value of downlink transmission.

The packet delay budget PDB indicates a maximum delay that can be tolerated in response to data being transmitted from the network device to the terminal device (or transmitted from the terminal device to the network device). The PDB includes time for automatic repeat request (hybrid automatic repeat request, HARQ) retransmission, scheduling, and the like. For example, the terminal device sends data to the network device or enable the network device to receive data in response to a delay of the data not being greater than a delay requirement of the PDB, and the network device sends the data to the terminal device or enable the terminal device to receive the data in response to the delay of the data not being greater than the delay requirement of the PDB.

It should be noted that "known in advance" means that according to the conventional technology, the remote terminal device and the network device obtains the mapping relationship between the QoS flow and the DRB 1, and the relay terminal device and the network device obtains the mapping relationship between the QoS flow and the DRB 2. A specific implementation is not limited in at least one embodiment. For details, refer to the conventional technology.

Figure 4:
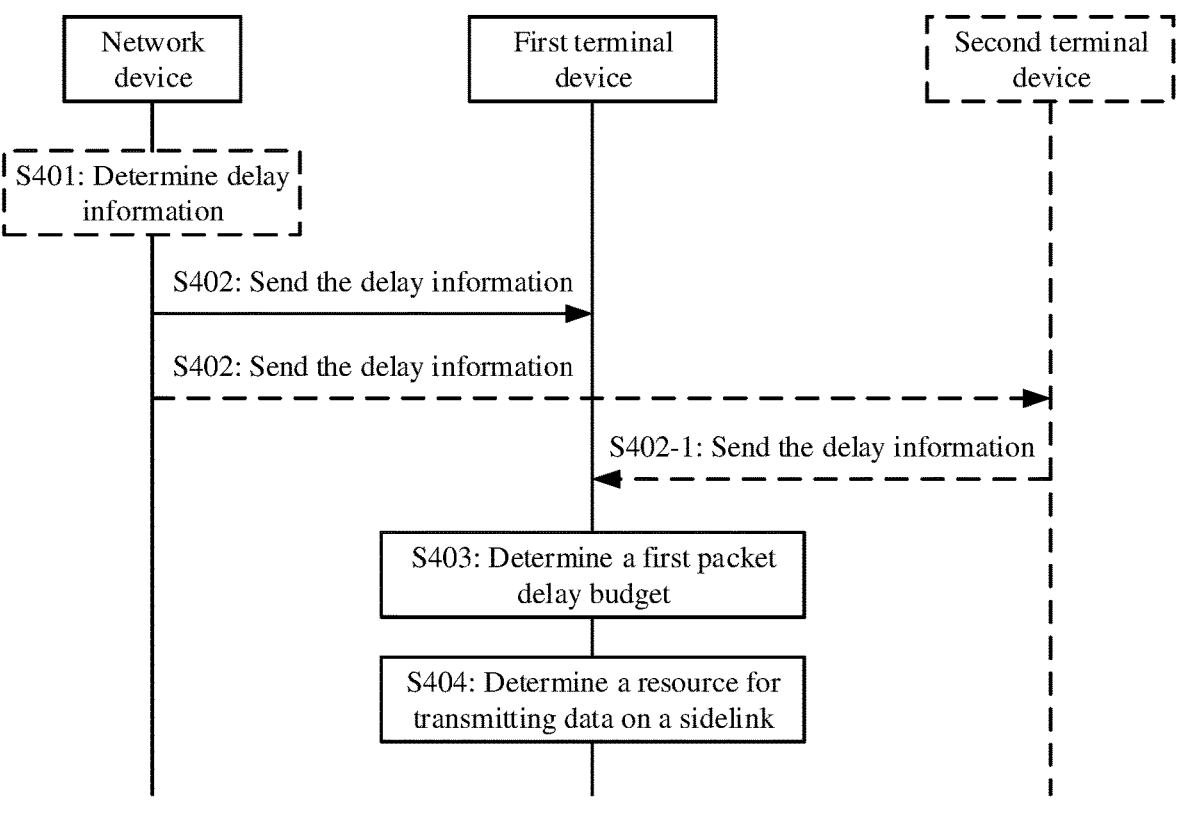
FIG. 4 is a schematic flowchart 1 of a communication method according to at least one embodiment.

Because the remote terminal device cannot directly communicate with the network device, downlink data that is to be sent by the network device to the remote terminal device is to be transmitted by the DRB 2 to the relay terminal device, and the relay terminal device transmit the downlink data to the remote terminal device by using the SL RB. FIG. 4 is described by using an application scenario in which the relay terminal device forwards downlink data from the network device to the remote terminal device as an example.

Figure 5:
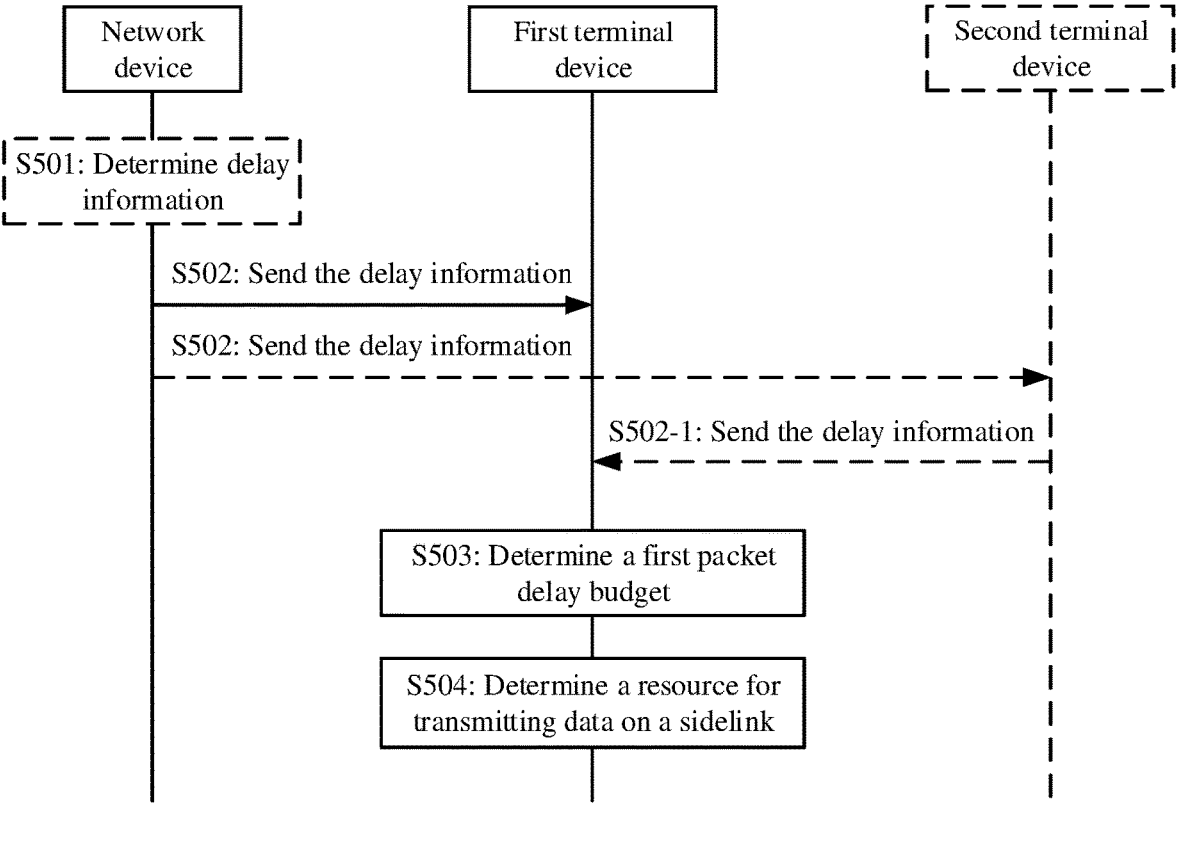
FIG. 5 is a schematic flowchart 2 of a communication method according to at least one embodiment.

Uplink data that is to be sent by the remote terminal device to the network device is to be transmitted by the SL RB to the relay terminal device, and the relay terminal device transmits the uplink data to the network device by using the DRB 2. FIG. 5 is described by using an application scenario in which the relay terminal device forwards uplink data from the remote terminal device to the network device as an example. The following describes a protocol architecture according to at least one embodiment.

Figure 3:
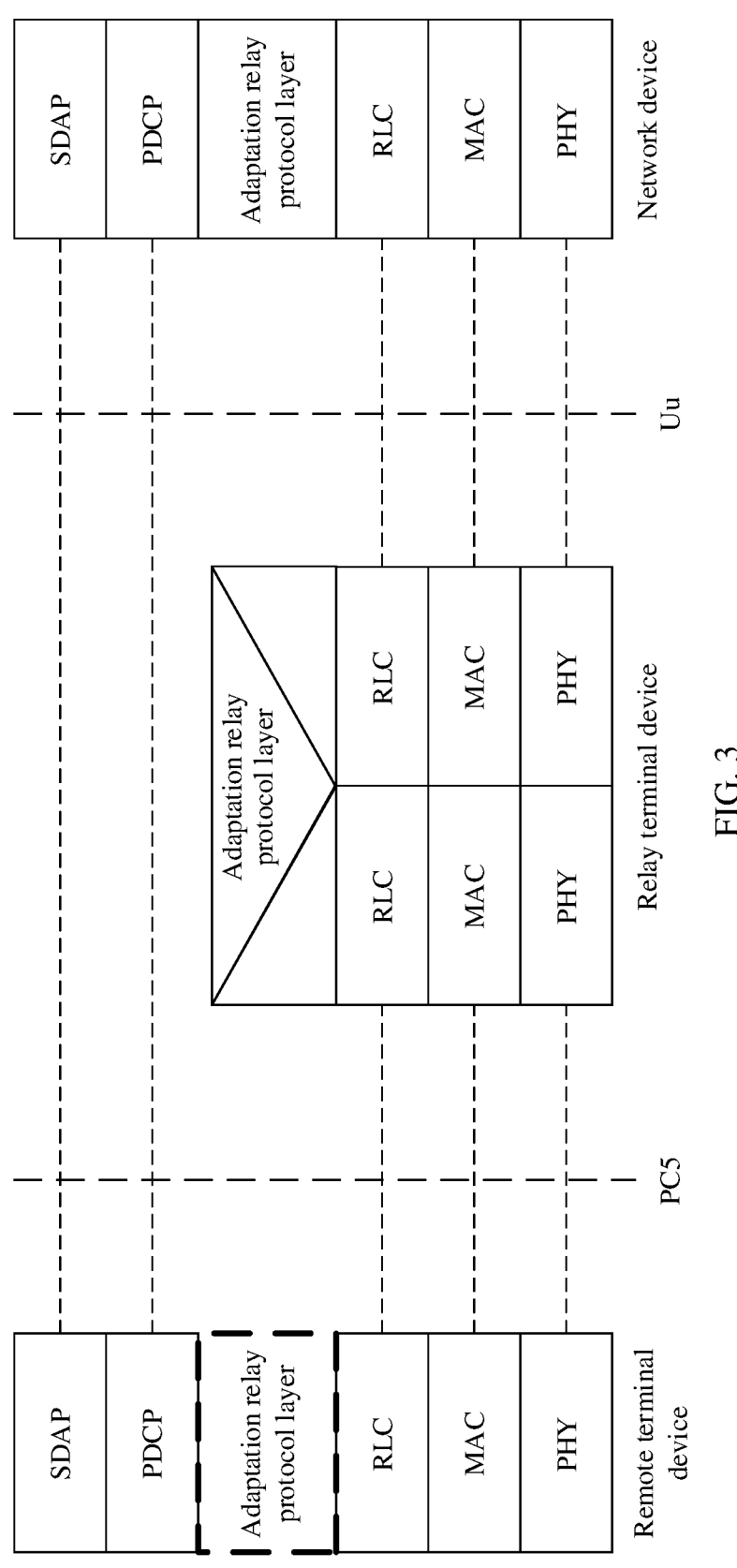
FIG. 3 is a diagram of a protocol architecture according to at least one embodiment.

FIG. 3 is a diagram of the protocol architecture according to at least one embodiment. A remote terminal device is the terminal device 2, the terminal device 3, the terminal device 5, the terminal device 6, or the terminal device 7 shown in FIG. 1, a relay terminal device is the terminal device 1 or the terminal device 4 shown in FIG. 1, and a network device is the network device shown in FIG. 1. The remote terminal device communicates with the relay terminal device through a PC5 interface, and the relay terminal device communicates with the network device through a Uu interface.

As shown in FIG. 3, from top to bottom, both the remote terminal device and the network device include a service data adaptation protocol (service data adaptation protocol, SDAP) layer and a packet data convergence protocol (packet data convergence protocol, PDCP) layer. Both the remote terminal device and the relay terminal device include a radio link control (radio link control, RLC) protocol layer, a media access control (media access control, MAC) protocol layer, and a physical (physical, PHY) layer. Both the relay terminal device and the network device include an RLC protocol layer, a MAC protocol layer, a PHY protocol layer, and an adaptation relay (adaptation relay) protocol layer. Optionally, the remote terminal device further includes an adaptation relay protocol layer. The SDAP protocol layer is used to map a QoS flow to a corresponding DRB.

It should be noted that FIG. 3 is an example of a diagram of the protocol architecture according to at least one embodiment. The protocol architecture further includes another protocol layer.

Specifically, protocol layers with a same name between the remote terminal device and the network device, between the remote terminal device and the relay terminal device, and between the relay terminal device and the network device is referred to as peer protocol layers or corresponding protocol layers. For example, the SDAP protocol layer of the remote terminal device and the SDAP protocol layer of the network device are a pair of peer protocol layers, the RLC protocol layer of the remote terminal device and the RLC protocol layer of the relay terminal device are a pair of peer protocol layers, and the RLC protocol layer of the relay terminal device and the RLC protocol layer of the network device are a pair of peer protocol layers.

The following describes a communication method In at least one embodiment, in detail with reference to FIG. 4 and FIG. 5.

FIG. 4 is a schematic flowchart 1 of a communication method according to at least one embodiment. FIG. 4 is described by using an application scenario in which a relay terminal device forwards downlink data from a network device to a remote terminal device as an example. For example, a first terminal device is the relay terminal device, and a second terminal device is the remote terminal device. For example, the first terminal device is the terminal device 1 or the terminal device 4 shown in FIG. 1, and the second terminal device is the terminal device 2, the terminal device 3, the terminal device 5, the terminal device 6, or the terminal device 7 shown in FIG. 1.

As shown in FIG. 4, the communication method includes the following steps.

S401: A network device determines delay information.

For example, the delay information indicates a packet delay budget (packet delay budget, PDB) that data transmission is to meet.

In some embodiments, the delay information includes first delay information.

For example, the first delay information includes a packet delay budget that is to be met in response to data being transmitted on a sidelink.

For another example, the first delay information corresponds to a QoS profile of a QoS flow transmitted on a sidelink, a QoS parameter corresponding to the QoS profile includes a 5QI, the 5QI corresponds to a packet delay budget PDB, and the QoS profile indicates a packet delay budget that is to be met in response to data being transmitted on the sidelink.

Specifically, the sidelink is a link for transmitting data between the first terminal device and the second terminal device.

With reference to FIG. 2, the first delay information is a value of a PDB associated with an SL RB or an SL logical channel (logical channel, LCH). Alternatively, the first delay information includes a QoS profile of a QoS flow mapped to an SL RB or an SL LCH, and a QoS parameter corresponding to the QoS profile includes a value of a PDB.

For example, the network device determines the first delay information by collecting statistics on time consumed for downlink (downlink, DL) scheduling or retransmission in a period of time. A statistics granularity is each QoS flow or each DRB.

Optionally, the first delay information is a fitting value determined by the network device.

In some embodiments, the delay information includes second delay information.

For example, the second delay information includes a packet delay budget that is to be met in response to data being transmitted on a first link.

For another example, the second delay information includes a QoS profile of a QoS flow transmitted on a first link, a QoS parameter corresponding to the QoS profile includes a 5QI, the 5QI corresponds to a packet delay budget PDB, and the QoS profile indicates a packet delay budget that is to be met in response to data being transmitted on the first link.

Specifically, the first link is a link for transmitting data between the relay terminal device and the network device. In the communication method shown in FIG. 4, the relay terminal device is the first terminal device.

With reference to FIG. 2, the first link is a link between the relay terminal device and the network device, and the second delay information includes the value of the PDB corresponding to the QoS flow mapped to the DRB 2. Alternatively, the second delay information includes a QoS profile of the QoS flow mapped to the DRB 2, and a QoS parameter corresponding to the QoS profile includes the value of the PDB.

In some embodiments, the delay information includes third delay information.

For example, the third delay information includes a packet delay budget corresponding to a first quality of service flow.

For another example, the third delay information corresponds to a QoS profile of the first quality of service flow, a QoS parameter corresponding to the QoS profile includes a 5QI, the 5QI corresponds to a packet delay budget PDB, and the QoS profile indicates a packet delay budget of the first QoS flow.

Specifically, the first quality of service flow is a quality of service flow between the remote terminal device and the network device. In the communication method shown in FIG. 4, the remote terminal device is the second terminal device.

With reference to FIG. 2, the first QoS flow is a QoS flow mapped to the DRB 1, and the third delay information includes the value of the PDB corresponding to the QoS flow mapped to the DRB 1. Alternatively, the third delay information includes a QoS profile of the QoS flow mapped to the DRB 1, and a QoS parameter corresponding to the QoS profile includes the value of the PDB.

It should be noted that step S401 in which the network device determines the delay information is optional.

S402: The network device sends the delay information to a terminal device. Correspondingly, the first terminal device receives the delay information from the network device, and/or the second terminal device receives the delay information from the network device.

The terminal device includes the first terminal device and/or the second terminal device.

For example, the network device directly sends the delay information to the first terminal device, so that the first terminal device determines a first packet delay budget based on the delay information. Alternatively, the network device sends the delay information to the second terminal device, so that the second terminal device performs S402-1. Alternatively, the network device sends the delay information to both the first terminal device and the second terminal device, for example, send first delay information to the first terminal device, and send third delay information to the second terminal device; or send first delay information to the first terminal device and the second terminal device.

In at least one embodiment, that the network device sends the delay information to the terminal device in S402 includes: The network device sends a radio resource control (radio resource control, RRC) reconfiguration message to the terminal device.

For example, the radio resource control reconfiguration message includes the delay information. The network device sends the delay information to the first terminal device and/or the second terminal device by using the RRC reconfiguration message.

For example, the radio resource control reconfiguration message includes bearer configuration and/or logical channel configuration, and the bearer configuration and/or logical channel configuration includes one or more pieces of delay information. Therefore, the first terminal device receives the delay information, to determine the first packet delay budget corresponding to the bearer/logical channel (for details, refer to S402 in the following), and further determines, based on the first packet delay budget, a sidelink resource that meets a delay requirement of to-be-transmitted data.

In at least one embodiment, that the network device sends the delay information to the terminal device in S402 includes: The network device sends one or more of the following to the terminal device: a media access control MAC sub-protocol data unit (sub-protocol data unit, sub-PDU), a MAC service data unit (service data unit, SDU), a MAC protocol data unit PDU, a MAC control element (control element, CE), padding (padding), and a header of an adaptation relay protocol layer.

The MAC subPDU, the MAC SDU, the MAC PDU, the MAC CE, and/or the padding includes the delay information.

For example, the delay information is carried in one or more of the following: the MAC subPDU, the MAC SDU, the MAC PDU, the MAC CE, and the padding.

With reference to FIG. 3, the network device adds the delay information to the MAC subPDU, the MAC SDU, the MAC PDU, the MAC CE, and/or the padding, transfer the delay information to a PHY protocol layer, and send the delay information to the terminal device through a Uu interface. The terminal device receives and parses the delay information. The terminal device identifies the delay information from the MAC subPDU, the MAC SDU, the MAC PDU, the MAC CE, and/or the padding.

Optionally, the delay information is carried in the header of the adaptation relay protocol layer.

With reference to FIG. 3, the network device encapsulates the delay information into the header of the adaptation relay protocol layer, sequentially transfer the delay information to an RLC protocol layer, a MAC protocol layer, and a PHY protocol layer that correspond to the first terminal device, encapsulate the delay information layer by layer, and send the delay information to the terminal device through the Uu interface.

Therefore, the network device determines the delay information, for example, the first delay information, based on time used for current downlink scheduling or reselection, and send the delay information to the terminal device. In other words, the network device dynamically indicates the packet delay budget that is to be met in response to data being transmitted on the sidelink, so that the first terminal device selects or requests a more appropriate resource that meets a quality of service requirement.

In at least one embodiment, that the first terminal device receives the delay information from the network device in S402 includes: The first terminal device receives a radio resource control reconfiguration message from the network device.

For a specific implementation of the radio resource control reconfiguration message, refer to the foregoing related examples. Details are not described herein again.

In at least one embodiment, that the first terminal device receives the delay information from the network device in S402 includes: The first terminal device receives one or more of the following from the network device: a MAC subPDU, a MAC SDU, a MAC PDU, a MAC CE, padding, and a header of an adaptation relay protocol layer.

With reference to FIG. 3, the first terminal device receives and parse the MAC subPDU, the MAC SDU, the MAC PDU, the MAC CE, and/or the padding, to identify the delay information.

With reference to FIG. 3, the first terminal device receives data/a data packet from the network device, parses the data/data packet layer by layer from the PHY protocol layer to the adaptation relay protocol layer, and identifies the delay information from the header of the adaptation relay protocol layer.

In at least one embodiment, that the second terminal device receives the delay information from the network device in S402 includes: The second terminal device receives a radio resource control reconfiguration message from the network device. For a specific implementation of the radio resource control reconfiguration message, refer to the foregoing related examples. Details are not described herein again.

In at least one embodiment, that the second terminal device receives the delay information from the network device in S402 includes: The second terminal device receives a MAC subPDU, a MAC SDU, a MAC PDU, a MAC CE, padding, and/or a header of an adaptation relay protocol layer from the network device. For an implementation, refer to the corresponding descriptions in that the first terminal device receives the delay information from the network device. Details are not described herein again.

In some embodiments, the communication method provided in at least one embodiment further includes: The network device sends first mapping information to the first terminal device. Correspondingly, the first terminal device receives the first mapping information from the network device.

Optionally, the first mapping information includes a sidelink bearer, a sidelink logical channel, a sidelink bearer configuration identifier, a mapping relationship between a sidelink logical channel identifier, a quality of service flow identifier (QoS flow identifier, QFI), and/or a QoS profile, a mapping relationship between the sidelink and the first delay information, or a mapping relationship between the sidelink and the third delay information.

For example, the network device encapsulates the QoS flow identifier (for example, the QFI) into the header of the adaptation relay protocol layer of the data packet for indication, sequentially transfer the delay information to an RLC protocol layer, a MAC protocol layer, and a PHY protocol layer that correspond to the first terminal device, encapsulate the delay information layer by layer, and send the delay information to the first terminal device through the Uu interface. The first terminal device receives the data packet from the network device, parses the data packet layer by layer from the PHY protocol layer to the adaptation relay protocol layer. The adaptation relay protocol layer of the first terminal device identifies the QoS flow identifier. The first terminal device determines, based on the first mapping information, the QoS profile and/or a QoS parameter corresponding to the QoS flow identifier, to further determine the first packet delay budget. Optionally, the adaption relay protocol layer of the first terminal device indicates the determined first packet delay budget to the MAC layer.

With reference to FIG. 1 and FIG. 2, an example in which the first mapping information includes a mapping relationship between a sidelink logical channel and a QFI or a QoS profile is used. It is assumed that the first terminal device is the terminal device 1, and the second terminal device is the terminal device 2. The first mapping information includes that an SL LCH between the terminal device 1 and the terminal device 2 is associated with a QoS flow 1, and an SL LCH between the terminal device 1 and the terminal device 7 is associated with a QoS flow 2 and a QoS flow 3.

Optionally, in response to the sidelink logical channel being associated with a plurality of PDB values or QoS flows, the first terminal device determines, based on the first mapping information, a PDB value or a QoS flow corresponding to downlink data of the sidelink logical channel.

For example, it is assumed that the SL LCH between terminal device 1 and the terminal device 7 is associated with the QoS flow 2 and the QoS flow 3. The terminal device 1 determines, from the QoS flow 2 and the QoS flow 3, a PDB corresponding to the downlink data of the sidelink logical channel.

Optionally, the first mapping information is carried in one or more of the following: an RRC message, the MAC subPDU, the MAC SDU, the MAC PDU, the MAC CE, the padding, and the header of the adaptation relay protocol layer. With reference to FIG. 3, the network device adds the first mapping information to the MAC subPDU, the MAC SDU, the MAC PDU, the MAC CE, and/or the padding, transfer the delay information to a PHY protocol layer, and send the delay information to the first terminal device through a Uu interface. The first terminal device receives and parses the first mapping information. The first terminal device identifies the delay information from the RRC message, the MAC subPDU, the MAC SDU, the MAC PDU, the MAC CE, and/or the padding.

Optionally, the first mapping information is carried in the header of the adaptation relay protocol layer. With reference to FIG. 3, the network device adds the first mapping information to the header of the adaptation relay protocol layer of the data packet. The terminal device receives the data packet, and parses the data packet layer by layer from the PHY protocol layer to the adaptation relay protocol layer. The adaptation relay protocol layer of the terminal device identifies the first mapping information.

S402-1: The second terminal device sends the delay information to the first terminal device. Correspondingly, the first terminal device receives the delay information from the second terminal device.

For example, after receiving the delay information, the second terminal device forwards the delay information to the first terminal device, so that the first terminal device determines the packet delay budget based on the delay information, and further selects a resource for transmitting downlink data on the sidelink.

In at least one embodiment, S402-1 includes: The second terminal device sends a radio resource control message to the first terminal device. Correspondingly, the first terminal device receives the radio resource control message from the second terminal device.

For example, the radio resource control message includes the delay information. Then, the second terminal device configures the delay information for the first terminal device by using a PC5 RRC message, so that the first terminal device determines the packet delay budget based on the delay information, and further selects a resource for transmitting downlink data on the sidelink.

For example, the radio resource control message includes bearer configuration and/or logical channel configuration, and the bearer configuration and/or logical channel configuration includes one or more pieces of delay information. Therefore, the first terminal device receives the delay information, to determine the first packet delay budget corresponding to the bearer/logical channel (for details, refer to S402 in the following), and further determines, based on the first packet delay budget, a sidelink resource that meets a delay requirement of to-be-transmitted data.

In at least one embodiment, S402-1 includes: The second terminal device sends a MAC subPDU, a MAC SDU, a MAC PDU, a MAC CE, padding, and/or a header of an adaptation relay protocol layer to the first terminal device. Correspondingly, the first terminal device receives the MAC subPDU, the MAC SDU, the MAC PDU, the MAC CE, the padding, and/or the header of the adaptation relay protocol layer from the second terminal device.

For example, the MAC subPDU, the MAC SDU, the MAC PDU, the MAC CE, and the padding includes the delay information.

With reference to FIG. 3, the second terminal device adds the delay information to the MAC subPDU, the MAC SDU, the MAC PDU, the MAC CE, and/or the padding, transfer the delay information to a PHY protocol layer, and send the delay information to the first terminal device through a PC5 interface. The first terminal device receives and parses the delay information. The first terminal device identifies the delay information from the MAC subPDU, the MAC SDU, the MAC PDU, the MAC CE, and/or the padding.

Optionally, the delay information is carried in the header of the adaptation relay protocol layer.

With reference to FIG. 3, the second terminal device encapsulates the delay information into the header of the adaptation relay protocol layer, sequentially transfer the delay information to an RLC protocol layer, a MAC protocol layer, and a PHY protocol layer that correspond to the first terminal device, encapsulate the delay information layer by layer, and send the delay information to the first terminal device through the PC5 interface. The first terminal device receives the delay information, parses the delay information layer by layer from the PHY protocol layer to the adaptation relay protocol layer, and identifies the delay information from the header of the adaptation relay protocol layer.

In an application scenario in which the relay terminal device forwards the downlink data from the network device to the remote terminal device, it is assumed that both the relay terminal device (the first terminal device) and the network device obtain the second delay information. Then, the delay information sent by the network device to the first terminal device and/or the second terminal device includes the first delay information and/or the third delay information, and may not include the second delay information. In actual application, in response to the relay terminal device not obtaining the second delay information, the network device sends the second delay information to the first terminal device and/or the second terminal device.

S403: The first terminal device determines the first packet delay budget.

For example, the first packet delay budget is a packet delay budget that is to be met in response to data being transmitted on the sidelink.

With reference to FIG. 2, the first packet delay budget is a packet delay budget that is to be met in response to data being transmitted between the relay terminal device and the remote terminal device.

Optionally, the first terminal device determines the first packet delay budget based on the delay information.

In at least one embodiment, that the first terminal device determines the first packet delay budget includes: The first terminal device determines the first packet delay budget based on the first delay information.

With reference to FIG. 2, in response to the first delay information including the value of the PDB associated with the SL RB or the SL LCH, or includes the QoS profile of the QoS flow mapped to the SL RB or the SL LCH, the value of the PDB in the first delay information is used as the first packet delay budget.

In at least one embodiment, that the first terminal device determines the first packet delay budget includes: The first terminal device determines the first packet delay budget based on the second delay information and the third delay information.

Specifically, the first terminal device uses a difference between a value of a PDB in the third delay information and a value of a PDB in the second delay information as the first packet delay budget.

With reference to FIG. 2, the third delay information includes a PDB corresponding to the QoS flow mapped to the DRB 1, and the second delay information includes a PDB corresponding to the QoS flow mapped to the DRB 2. The first packet delay budget is the difference between the value of the PDB in the third delay information and the value of the PDB in the second delay information.

For example, it is assumed that the value of the PDB in the third delay information is 6 ms, the value of the PDB in the second delay information is 4 ms, and the first packet delay budget is 6 ms−4 ms=2 ms.

Alternatively, with reference to FIG. 2, the third delay information is a PDB associated with the DRB 1, the second delay information is a PDB associated with the DRB 2, and the PDB associated with the DRB 1 and/or the PDB associated with the DRB 2 is preconfigured or configured by the network device. The first packet delay budget is the difference between the value of the PDB in the third delay information and the value of the PDB in the second delay information.

In at least one embodiment, that the first terminal device determines the first packet delay budget, the second delay information, or the third delay information includes: The first terminal device determines the first packet delay budget corresponding to a bearer/logical channel, the second delay information, or the third delay information.

For example, the first terminal device determines a first logical channel from the bearer/logical channel. The first logical channel is a logical channel including data. In response to one first logical channel being determined, a packet delay budget corresponding to the first logical channel is used as the first packet delay budget. In response to a plurality of first logical channels being determined, the plurality of determined first logical channels correspond to a plurality of packet delay budgets, and a minimum value of the plurality of packet delay budgets, an average value of the plurality of packet delay budgets, or a packet delay budget corresponding to a first logical channel with a highest priority is used as the first packet delay budget.

S404: The first terminal device determines the resource for transmitting data on the sidelink.

Optionally, the first terminal device determines, based on the first packet delay budget, the resource for transmitting data on the sidelink. For example, the transmitted data includes initially transmitted data and/or data retransmitted for one or more times.

Optionally, the first terminal device determines, through scheduling a resource by the network device, the resource for transmitting data on the sidelink.

In at least one embodiment, S404 includes step 1 and step 2.

Step 1: The first terminal device sends a buffer status report (buffer status report, BSR) to the network device.

Optionally, the BSR includes the first packet delay budget.

For example, in response to the first terminal device is to transmit data on the sidelink, the first terminal device sends, to the network device, a packet delay budget that is to be met for currently transmitting data on the sidelink, so that the network device allocates, to the first terminal device, a resource for transmitting data.

Step 2: The network device allocates, based on the buffer status report to the first terminal device, the resource for transmitting data on the sidelink.

Optionally, the first terminal device may autonomously select the resource for transmitting data on the sidelink.

In at least one embodiment, S404 includes step 3.

Step 3: The first terminal device may select a resource from a preconfigured or preset resource pool based on the first packet delay budget.

Optionally, the network device configures the resource pool for the first terminal device by using system information, or configure the resource pool for the first terminal device in a pre-configuration manner, or configure the resource pool for the first terminal device by using dedicated signaling. This is not limited in at least one embodiment.

For example, it is assumed that the first packet delay budget is 2 ms, and a resource that is used by the first terminal device in the resource pool includes a resource of 1 ms, 2 ms, or 3 ms. Then, the first terminal device selects a resource less than or equal to 2 ms, for example, the resource of 1 ms or the resource of 2 ms, and use the resource as the resource for transmitting data on the sidelink.

For another example, it is assumed that the first packet delay budget is 2 ms, and a resource that is used by the first terminal device in the resource pool includes a resource of 3 ms, 4 ms, or 5 ms. The first terminal device cannot select a resource that meets the first packet delay budget, and the first terminal device performs step 4.

In some embodiments, the communication method provided in at least one embodiment further includes step 4 and step 5.

Step 4: The first terminal device sends first indication information to the network device. Correspondingly, the network device receives the first indication information from the first terminal device.

Optionally, the first indication information indicates a second packet delay budget of data transmitted on the sidelink.

For example, in response to selecting, from the resource pool based on the first packet delay budget, the resource for transmitting data on the sidelink, in response to no resource that meets the first packet delay budget being selected, the first terminal device sends the first indication information to the network device, to indicate the second packet delay budget, in the resource pool, that actually is met in response to data being transmitted on the sidelink.

For example, it is assumed that the first packet delay budget is 2 ms, and a resource that is used by the first terminal device in the resource pool includes a resource of 4 ms, 5 ms, or 6 ms. The first indication information includes 4 ms, 5 ms, or 6 ms. In other words, the second packet delay budget is 4 ms, 5 ms, and/or 6 ms, and the second packet delay budget is a minimum value of 4 ms by default.

Optionally, the first terminal device sends sidelink user equipment information (sidelink UE information, SUI) and/ or the BSR to the network device. Correspondingly, the network device receives the SUI and/or the BSR from the first terminal device.

An sl-QoS-InfoList field of the SUI indicates the first indication information, and the BSR includes the first indication information.

Optionally, the first indication information is carried in one or more of the following: a MAC subPDU, a MAC SDU, a MAC PDU, a MAC CE, padding, and a header of an adaptation relay protocol layer.

Step 5: The network device determines the first delay information and/or the second delay information based on the first indication information.

Optionally, the network device determines the second packet delay budget indicated by the first indication information as new first delay information, and determine the difference between the value of the PDB in the third delay information and the value of the PDB in the second delay information as new second delay information.

For example, it is assumed that the value of the PDB in the third delay information is 6 ms, the value of the PDB in the second delay information is 4 ms, and the first packet delay budget is 2 ms. A resource that is used by the first terminal device in the resource pool includes a resource of 4 ms, 5 ms, or 6 ms, and the second packet delay budget is 4 ms. The network device determines the second packet delay budget of 4 ms as the new first delay information, and a value of a PDB in the new second delay information is 6 ms−4 ms=2 ms, to adjust the value of the PDB in the second delay information to 2 ms.

Optionally, the network device performs S402, to send the new first delay information and/or the new second delay information to the first terminal device.

Therefore, the first terminal device determines, based on the new first delay information and/or the new second delay information, a new packet delay budget of data transmitted on the sidelink, to successfully determine, based on the new packet delay budget, the resource for transmitting data on the sidelink.

According to the communication method shown in FIG. 4, in response to the first terminal device serving as a relay terminal device to send data to the remote terminal device (for example, the second terminal device), the first terminal device determines, based on the received delay information, the first packet delay budget that is to be met in response to data being transmitted on the sidelink, and further determines, based on the first packet delay budget, a sidelink resource that meets a delay requirement of to-be-transmitted data. This ensures a quality of service requirement of data transmission, and improves data transmission efficiency.

FIG. 5 is a schematic flowchart 2 of a communication method according to at least one embodiment. FIG. 5 is described by using an application scenario in which a relay terminal device forwards uplink data from a remote terminal device to a network device as an example. For example, a first terminal device is the remote terminal device, and a second terminal device is the relay terminal device. For example, the first terminal device is the terminal device 2, the terminal device 3, the terminal device 5, the terminal device 6, or the terminal device 7 shown in FIG. 1, and the second terminal device is the terminal device 1 or the terminal device 4 shown in FIG. 1.

S501: A network device determines delay information.

For example, the delay information indicates a packet delay budget that data transmission is to meet.

In some embodiments, the delay information includes first delay information. For a specific implementation of the first delay information, refer to S401. Details are not described herein again.

In some embodiments, the delay information includes second delay information, and the second delay information includes a packet delay budget that is to be met in response to data being transmitted on a first link.

For example, the first link is a link for transmitting data between the relay terminal device and the network device. In the communication method shown in FIG. 4, the relay terminal device is the second terminal device.

For a specific implementation of the second delay information, refer to S401. Details are not described herein again.

In some embodiments, the delay information includes third delay information.

For example, the third delay information includes a packet delay budget corresponding to a first quality of service flow.

For example, the first quality of service flow is a quality of service flow between the remote terminal device and the network device. In the communication method shown in FIG. 5, the remote terminal device is the first terminal device.

For a specific implementation of the third delay information, refer to S401. Details are not described herein again.

It should be noted that step S501 in which the network device determines the delay information is optional.

S502: The network device sends the delay information to a terminal device. Correspondingly, the first terminal device receives the delay information from the network device, and/or the second terminal device receives the delay information from the network device.

The terminal device includes the first terminal device and/or the second terminal device.

For a specific implementation of S502, refer to S402. Details are not described herein again.

S502-1: The second terminal device sends the delay information to the first terminal device. Correspondingly, the first terminal device receives the delay information from the second terminal device.

For a specific implementation of S502-1, refer to S402-1. Details are not described herein again.

In an application scenario in which the relay terminal device forwards the uplink data from the remote terminal device to the network device, it is determined that both the remote terminal device (the first terminal device) and the network device obtain the third delay information. Then, the delay information sent by the network device to the first terminal device and/or the second terminal device includes the first delay information and/or the second delay information, and may not include the third delay information. In actual application, in response to the remote terminal device not obtaining the third delay information, the network device sends the third delay information to the first terminal device and/or the second terminal device.

S503: The first terminal device determines a first packet delay budget.

For a specific implementation of S503, refer to S403. Details are not described herein again.

S504: The first terminal device determines a resource for transmitting data on a sidelink.

Optionally, the first terminal device determines, based on the first packet delay budget, the resource for transmitting data on the sidelink.

For a specific implementation of S504, refer to step 1 and step 2, or step 3. Details are not described herein again.

In response to the first terminal device not selecting, from a resource pool, a resource that meets the first packet delay budget, the first terminal device directly sends first indication information to the network device. For a specific implementation, refer to step 4 and step 5. Alternatively, the first terminal device performs step 6 or step 9.

In some embodiments, the communication method provided in at least one embodiment further includes step 6 to step 8.

Step 6: The first terminal device sends the first indication information to the second terminal device. Correspondingly, the second terminal device receives the first indication information from the first terminal device.

For a specific implementation of the first indication information, refer to step 4. Details are not described herein again.

For example, in response to the first terminal device not determining a resource that meets the first packet delay budget, the first terminal device sends the first indication information to the second terminal, to indicate a second packet delay budget, in the resource pool, that actually is met in response to data being transmitted on the sidelink, so that the second terminal device determines a packet delay budget that the first link is to meet, and sends the packet delay budget to the network device.

Step 7: The second terminal device sends the first indication information to the network device. Correspondingly, the network device receives the first indication information from the terminal device.

For example, the first indication information is forwarded by the relay terminal device to the network device, so that the network device determines new first delay information and/or new second delay information.

Step 8: The network device determines the first delay information and/or the second delay information based on the first indication information.

For a specific implementation of step 8, refer to step 5. Details are not described herein again.

Therefore, the first terminal device determines, based on the new first delay information and/or the new second delay information, a new packet delay budget of data transmitted on the sidelink, to successfully determine, based on the new packet delay budget, the resource for transmitting data on the sidelink.

In some embodiments, the communication method provided in at least one embodiment further includes step 9 to step 11.

It should be noted that one or more of step 9 to step 11 and one or more of step 6 to step 8 is used in combination, or is used independently. This is not limited In at least one embodiment.

Step 9: The first terminal device sends second indication information to the second terminal device. Correspondingly, the second terminal device receives the second indication information from the first terminal device.

Optionally, the second indication information indicates a third packet delay budget of data transmitted on the first link.

For example, the second indication information is determined based on the third delay information and the second packet delay budget, in the resource pool, that actually is met in response to data being transmitted on the sidelink.

For example, it is assumed that a value of a PDB in the third delay information is 6 ms, the second packet delay budget is 4 ms, and the third packet delay budget is a difference between a value of a PDB in the third delay information and the second packet delay budget, that is, 6 ms−4 ms=2 ms.

Optionally, step 9 includes: The first terminal device sends sidelink control information (sidelink control information, SCI) to the second terminal device. Correspondingly, the second terminal device receives the SCI from the first terminal device.

The SCI includes second indication information.

Optionally, step 9 includes: The first terminal device sends a MAC subPDU, a MAC SDU, a MAC PDU, a MAC CE, padding, and/or a header of an adaptation relay protocol layer to the second terminal device. Correspondingly, the second terminal device receives the MAC subPDU, the MAC SDU, the MAC PDU, the MAC CE, the padding, and/or the header of the adaptation relay protocol layer from the first terminal device.

For example, the MAC subPDU, the MAC SDU, the MAC PDU, the MAC CE, the padding, and/or the header of the adaptation relay protocol layer includes the second indication information, or the third packet delay budget of data transmitted on the first link.

Step 10: The second terminal device sends the second indication information to the network device. Correspondingly, the network device receives the second indication information from the terminal device.

For example, the second terminal device sends a buffer status report to the network device. Correspondingly, the network device receives the buffer status report from the second terminal device.

The buffer status report includes the second indication information, and the buffer status report further includes data indicating that there is data that does not meet a packet delay budget in an uplink logical channel group (uplink logical channel group, UL LCG). The LCG includes one or more LCHs.

Table 1 is an example of a signaling structure of the buffer status report provided in at least one embodiment.

For example, the signaling structure includes eight bits. $B_0$ to $B_7$ in a first row indicates whether the buffer status report includes the second indication information corresponding to a logical channel group, or whether the buffer status report includes the third packet delay budget corresponding to a logical channel group. $B_0$ to $B_7$ correspond to $LCG_0$ to $LCG_7$. For example, $B_0$ to $B_7$ is binary 0 or 1. In response to $B_0$ being 1, the buffer status report includes the third packet delay budget corresponding to $LCG_0$, and a PDB 0 (for example, a fourth row) exists in Table 1. In response to $B_0$ being 0, it indicates that the buffer status report does not include the third packet delay budget corresponding to $LCG_0$, and the PDB 0 does not exist in Table 1. Alternatively, in response to $B_0$ is 1, the buffer status report does not include the third packet delay budget corresponding to $LCG_0$, and a PDB 0 does not exist in Table 1.

In response to $B_0$ being 0, the buffer status report includes the third packet delay budget corresponding to $LCG_0$, and the PDB 0 (for example, a fourth row) exists in Table 1. $B_1$ to $B_7$ are similar to $B_0$, and details are not described herein again.

$B_0$ to $B_7$ in the first row alternatively indicates whether data that does not meet a packet delay budget exists in $LCG_0$ to $LCG_7$. For example, $B_0$ to $B_7$ is binary 0 or 1. In response to $B_0$ being 1, data that does not meet a packet delay budget exists in $LCG_0$, and a buffer size 0 (for example, a third row) exists in Table 1. In response to $B_0$ being 0, data that does not meet a packet delay budget does not exist in $LCG_0$, and a buffer size 0 does not exist in Table 1. Alternatively, in response to $B_0$ being 1, data that does not meet a packet delay budget does not exist in corresponding $LCG_0$, and a buffer size 0 does not exist in Table 1. In response to $B_0$ being 0, data that does not meet a packet delay budget exists in corresponding $LCG_0$, and a buffer size 0 (for example, a third row) exists in Table 1. $B_1$ to $B_7$ are similar to $B_0$, and details are not described herein again.

The buffer size 0 (buffer size 0) may store corresponding data signaling in $LCG_0$.

TABLE 1

| $B_7$ | $B_6$ | $B_5$ | $B_4$ | $B_3$ | $B_2$ | $B_1$ | $B_0 = 1$ |
|---|---|---|---|---|---|---|---|
| $LCG_7$ | $LCG_6$ | $LCG_5$ | $LCG_4$ | $LCG_3$ | $LCG_2$ | $LCG_1$ | $LCG_0$ |
| Buffer size 0 | | | | | | | |
| PDB 0 | | | | | | | |
| ... | | | | | | | |
| Buffer size 7 | | | | | | | |
| PDB 7 | | | | | | | |

Optionally, the second terminal device determines whether the second delay information meets the third delay budget in the second indication information. In response to the second delay information meeting the third delay budget in the second indication information (for example, the value of the PDB in the second delay information is less than or equal to the value of the PDB in the third delay budget), step 10 is not performed, and the first delay information and the second delay information remain unchanged. In response to the second delay information not meeting the third delay budget in the second indication information, step 10 is performed.

Step 11: The network device determines the first delay information and/or the second delay information based on the second indication information.

Optionally, the network device determines the third packet delay budget indicated by the second indication information as new second delay information, and determine the difference between the value of the PDB in the third delay information and the value of the PDB in the new second delay information as new first delay information. The network device performs S602, to send the new first delay information and/or the new second delay information to the first terminal device.

Therefore, the first terminal device determines, based on the new first delay information and/or the new second delay information, a new packet delay budget of data transmitted on the sidelink, to successfully determine, based on the new packet delay budget, the resource for transmitting data on the sidelink.

Optionally, the first terminal device determines, based on the new first delay information and/or the new second delay information, a new packet delay budget of data transmitted on the sidelink, to successfully determine, based on the new packet delay budget, the resource for transmitting data on the sidelink.

Optionally, with reference to FIG. 2, the network device reconfigures a link resource based on the new delay information, for example, reconfiguring a DRB, a mapping relationship between a QoS flow, a DRB 2, and an SL LCH, establishing a new PDU session, and/or establishing a new QoS flow, to ensure a delay requirement of transmitting data by the first terminal device on the sidelink.

According to the communication method shown in FIG. 5, in response to the first terminal device serving as a remote terminal device to send data to the relay terminal device (for example, the second terminal device), the first terminal device determines, based on the received delay information, the packet delay budget that is to be met in response to data being transmitted on the sidelink, and further determines, based on the first packet delay budget, a sidelink resource that meets a delay requirement of to-be-transmitted data. This ensures a quality of service requirement of data transmission, and improves data transmission efficiency.

Embodiments described herein do not limit a sequence of the steps, and a manner in which the steps form the technical solutions. For example, a sequence of S401 to S404 is not limited In at least one embodiment. S401 to S404 is used in combination, or is used independently. A sequence of S501 to S504 is not limited In at least one embodiment. S501 to S504 is used in combination, or is used independently. One or more of S401 to S404 and one or more of S501 to S504 is used in combination, or is used independently. This is not limited In at least one embodiment.

To implement functions of the foregoing embodiments, the first terminal device, the second terminal device, and the network device include a corresponding hardware structure and/or a software module for performing the functions. A person skilled in the art should easily be aware that, in combination with units and method steps of the examples described in the embodiments disclosed in at least one embodiment, this application is implemented by hardware, software, or a combination of hardware and software. Whether a function is executed by hardware, software, or hardware driven by computer software depends on particular application scenarios and design constraints of the technical solutions.

Figure 6:
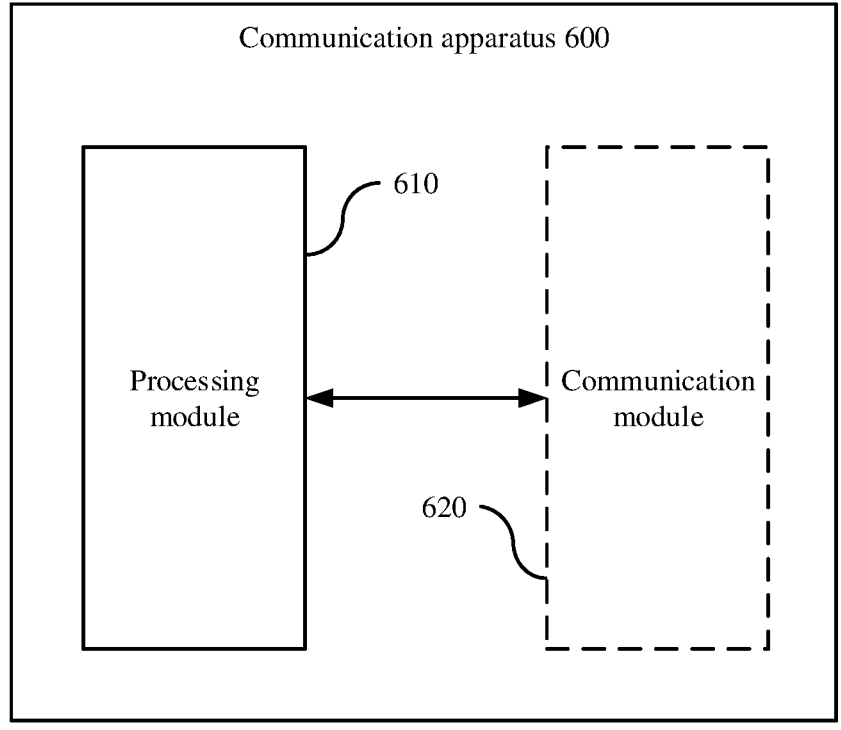
FIG. 6 is a schematic diagram 1 of a structure of a communication apparatus according to at least one embodiment.

FIG. 6 is a schematic diagram 1 of a structure of a communication apparatus according to at least one embodiment.

In at least one embodiment, a communication apparatus 600 is a first terminal device, to implement the method on a first terminal device side shown in FIG. 4 or FIG. 5. The communication apparatus 600 alternatively is an apparatus that supports a first terminal device in implementing the method. The communication apparatus 600 is installed in the first terminal device or used in a matching manner with the first terminal device.

In another possible implementation, a communication apparatus 600 is a second terminal device, to implement the method on a second terminal device side shown in FIG. 4 or FIG. 5. The communication apparatus 600 alternatively is an apparatus that supports a second terminal device in implementing the method. The communication apparatus 600 is installed in the second terminal device or used in a matching manner with the second terminal device.

In at least one embodiment, a communication apparatus 600 is a network device, to implement the method on a network device side shown in FIG. 4 or FIG. 5. The communication apparatus 600 alternatively is an apparatus that supports a network device in implementing the method. The communication apparatus 600 is installed in the network device or used in a matching manner with the network device.

The communication apparatus 600 is a hardware structure, a software module, or a combination of a hardware structure and a software module. The communication apparatus 600 is implemented by a chip system. In at least one embodiment, the chip system includes a chip, or includes a chip and another discrete device. The communication apparatus 600 includes a processing module 610 and a communication module 620. The processing module 610 may generate a to-be-sent signal, and uses the communication module 620 to send the signal. The processing module 610 receives a signal by using the communication module 620, and process the received signal. The processing module 610 is coupled to the communication module 620.

Coupling In at least one embodiment, is indirect coupling or connection between apparatuses, units, or modules, and is in an electrical, mechanical, or another form, and is used for information exchange between the apparatuses, units, or modules. Coupling is wired connection or wireless connection.

In at least one embodiment, the communication module is a circuit, a module, a bus, an interface, a transceiver, a pin, or another apparatus that can implement a sending and receiving function. This is not limited in at least one embodiment.

Figure 7:
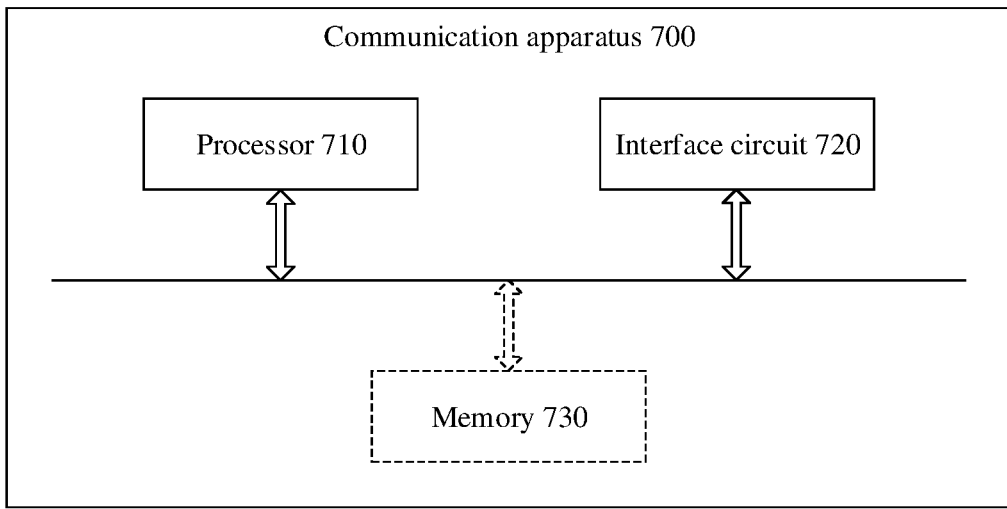
FIG. 7 is a schematic diagram 2 of a structure of a communication apparatus according to at least one embodiment.

FIG. 7 is a schematic diagram 2 of a structure of a communication apparatus according to at least one embodiment.

In at least one embodiment, a communication apparatus 700 is a first terminal device, to implement the method on a first terminal device side In at least one embodiment. The communication apparatus 700 alternatively is an apparatus, for example, a chip system, that supports a first terminal device in implementing the method. The communication apparatus 700 is installed in the first terminal device or used in a matching manner with the first terminal device.

In at least one embodiment, a communication apparatus 700 is a second terminal device, to implement the method on a second terminal device side In at least one embodiment. The communication apparatus 700 alternatively is an apparatus, for example, a chip system, that supports a second terminal device in implementing the method. The communication apparatus 700 is installed in the second terminal device or used in a matching manner with the second terminal device.

In at least one embodiment, a communication apparatus 700 is a network device, to implement the method on a network device side In at least one embodiment. The communication apparatus 700 alternatively is an apparatus, for example, a chip system, that supports a network device in implementing the method. The communication apparatus 700 is installed in the network device or used in a matching manner with the network device.

As shown in FIG. 7, the communication apparatus 700 includes a processor 710 and an interface circuit 720. The processor 710 is coupled to the interface circuit 720. It is understood that the interface circuit 720 is a transceiver or an input/output interface. Optionally, the communication apparatus 700 further includes a memory 730, configured to store instructions that is executed by the processor 710, input data required by the processor 710 to run the instructions, and/or data generated after the processor 710 runs the instructions.

In response to the communication apparatus 700 being configured to implement the method shown in FIG. 4 or FIG. 5, the processor 710 is configured to perform a function of the processing module 610, and the interface circuit 720 is configured to perform a function of the communication module 620.

In response to the communication apparatus being a chip applied to the first terminal device, the chip of the first terminal device implements a function of the first terminal device in the method embodiments. The chip of the first terminal device receives information from another module (for example, a radio frequency module or an antenna) of the first terminal device, where the information is sent by the network device or the second terminal device to the first terminal device. Alternatively, the chip of the first terminal device sends information to another module (for example, a radio frequency module or an antenna) of the first terminal device, where the information is sent by the first terminal device to the network device or the second terminal device.

In response to the communication apparatus being a chip applied to the second terminal device, the chip of the second terminal device implements a function of the second terminal device in the method embodiments. The chip of the second terminal device receives information from another module (for example, a radio frequency module or an antenna) of the second terminal device, where the information is sent by the network device or the first terminal device to the second terminal device. Alternatively, the chip of the second terminal device sends information to another module (for example, a radio frequency module or an antenna) of the second terminal device, where the information is sent by the second terminal device to the network device or the first terminal device.

In response to the communication apparatus being a chip applied to the network device, the chip of the network terminal device implements a function of the network device in the method embodiments. The chip of the network device receives information from another module (for example, a radio frequency module or an antenna) of the network device, where the information is sent by the first terminal device or the second terminal device to the network device. Alternatively, the chip of the network device sends information to another module (for example, a radio frequency module or an antenna) of the network device, where the information is sent by the network device to the first terminal device or the second terminal device.

The processor In at least one embodiment, is a central processing unit (central processing unit, CPU), or is another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor is a microprocessor, or the processor is any conventional processor or the like.

The processor In at least one embodiment, is a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, to enable the processor to read information from the storage medium and write information into the storage medium. It is clear that the storage medium is a component of the processor. The processor and the storage medium is located in an ASIC. In addition, the ASIC is located in the first terminal device, the second terminal device, or the network device. It is clear that the processor and the storage medium may alternatively exist in the first terminal device, the second terminal device, or the network device as discrete components.

All or some of the embodiments is implemented by using software, hardware, firmware, or any combination thereof. In response to the software being used to implement the embodiments, all or some of the embodiments is implemented in a form of a computer program product. The computer program product includes one or more computer programs or instructions. In response to the computer programs or the instructions being loaded and executed on a computer, the procedure or functions according to embodiments of this application are all or partially performed. The computer is a general-purpose computer, a dedicated computer, a computer network, a first terminal device, a second terminal device, a network device, or another programmable apparatus. The computer programs or the instructions is stored in a computer-readable storage medium, or is transmitted by using the computer-readable storage medium. The computer-readable storage medium is any usable medium accessible by the computer, or a data storage device such as a server integrating one or more usable media. The usable medium is a magnetic medium, for example, a floppy disk, a hard disk drive, or a magnetic tape; or is an optical medium, for example, a DVD; or is a semiconductor medium, for example, a solid-state disk (solid-state disk, SSD).

In at least one embodiment, unless otherwise stated or there is a logic conflict, terms and/or descriptions between different embodiments are/is consistent and is mutually referenced, and technical features in different embodiments is combined based on an internal logical relationship thereof, to form a new embodiment.

Various numbers in at least one embodiment, are merely for distinguishing for ease of description, and are not intended to limit the scope of embodiments described herein. Sequence numbers of the foregoing processes do not mean execution sequences. The execution sequences of the processes should be determined based on functions and internal logic of the processes.

What is claimed is:

1. A communication method, comprising:
receiving, by a first terminal device and from a network device, delay information, wherein the delay information includes first delay information, and the first delay information includes a packet delay budget that is to be met in response to data being transmitted on a sidelink;
determining according to the first delay information, by the first terminal device, a first packet delay budget of the data transmitted on the sidelink, wherein the sidelink is a link for transmitting data between the first terminal device and a second terminal device; and
determining according to the first packet delay budget, by the first terminal device, a resource for transmitting data on the sidelink that meets a delay requirement of the first packet delay budget.

2. The communication method according to claim 1, wherein the first terminal device is a relay terminal device and the second terminal device is a remote terminal device;

or the first terminal device is a remote terminal device and the second terminal device is a relay terminal device.

3. The communication method according to claim 1, wherein the receiving the delay information includes receiving second delay information, the second delay information includes a packet delay budget that is to be met in response to data being transmitted on a first link, the first link is a link for transmitting data between a relay terminal device and a network device, and the relay terminal device is the first terminal device or the second terminal device.

4. The communication method according to claim 3, wherein the receiving the delay information includes receiving third delay information, the third delay information includes a packet delay budget corresponding to a first quality of service flow, the first quality of service flow is a quality of service flow between a remote terminal device and the network device, and the remote terminal device is the first terminal device or the second terminal device.

5. The communication method according to claim 4, wherein the determining, by the first terminal device, a first packet delay budget includes:
determining, by the first terminal device, the first packet delay budget based on the second delay information and the third delay information, wherein the second delay information includes the packet delay budget that is to be met in response to data being transmitted on the first link, and the first link is the link for transmitting data between the relay terminal device and the network device.

6. The communication method according to claim 1, wherein the method further comprises:
sending, by the first terminal device, first indication information to the network device, wherein the first indication information indicates a second packet delay budget of data transmitted on the sidelink.

7. The communication method according to claim 1, wherein the method further comprises:
sending, by the first terminal device, first indication information to the second terminal device, wherein the first indication information indicates a second packet delay budget of data transmitted on the sidelink.

8. The communication method according to claim 1, wherein the method further comprises:
sending, by the first terminal device, second indication information to the second terminal device, wherein the second indication information indicates a third packet delay budget of data transmitted on the first link.

9. A first terminal device, comprising:
at least one processor; and
one or more memories including computer instructions that, in response to being executed by the at least one processor, cause the first terminal device to perform operations including:
receiving, from a network device, delay information, wherein the delay information includes first delay information, and the first delay information includes a packet delay budget that is to be met in response to data being transmitted on a sidelink;
determining according to the first delay information, a first packet delay budget of the data transmitted on the sidelink, wherein the sidelink is a link for transmitting data between the first terminal device and a second terminal device; and
determining according to the first packet delay budget, a resource for transmitting data on the sidelink that meets a delay requirement of the first packet delay budget.

10. The first terminal device according to claim 9, wherein the first terminal device is a relay terminal device and the second terminal device is a remote terminal device; or the first terminal device is a remote terminal device and the second terminal device is a relay terminal device.

11. The first terminal device according to claim 9, wherein the delay information includes second delay information, the second delay information includes a packet delay budget that is to be met in response to data being transmitted on a first link, the first link is a link for transmitting data between a relay terminal device and a network device, and the relay terminal device is the first terminal device or the second terminal device.

12. The first terminal device according to claim 11, wherein the delay information includes third delay information, the third delay information includes a packet delay budget corresponding to a first quality of service flow, the first quality of service flow is a quality of service flow between a remote terminal device and the network device, and the remote terminal device is the first terminal device or the second terminal device.

13. The first terminal device according to claim 12, wherein the determining the first packet delay budget includes:

determining the first packet delay budget based on the second delay information and the third delay information, wherein the second delay information includes the packet delay budget that is to be met in response to data being transmitted on the first link, and the first link is the link for transmitting data between the relay terminal device and the network device.

14. The first terminal device according to claim 9, wherein the at least one processor is further configured to perform operations including:

sending first indication information to the network device, wherein the first indication information indicates a second packet delay budget of data transmitted on the sidelink.

15. The first terminal device according to claim 9, wherein the at least one processor is further configured to perform operations including:

sending first indication information to the second terminal device, wherein the first indication information indicates a second packet delay budget of data transmitted on the sidelink.

16. A network device, comprising:
at least one processor; and one or more memories including computer instructions that, in response to being executed by the at least one processor, cause the network device to perform operations comprising:

determining delay information, wherein the delay information includes first delay information, and the first delay information includes a packet delay budget that is to be met in response to data being transmitted on a sidelink, wherein the sidelink is a link for transmitting data between a first terminal device and a second terminal device that meets a delay requirement of a first packet delay budget; and sending the delay information to a terminal device, wherein the terminal device includes the first terminal device and/or the second terminal device.

17. The network device according to claim 16, wherein the delay information includes second delay information, the second delay information includes a packet delay budget that is to be met in response to data being transmitted on a first link, the first link is a link for transmitting data between a relay terminal device and the network device, and the relay terminal device is the first terminal device or the second terminal device.

18. The network device according to claim 16, wherein the delay information includes third delay information, the third delay information includes a packet delay budget corresponding to a first quality of service flow, the first quality of service flow is a quality of service flow between a remote terminal device and the network device, and the remote terminal device is the first terminal device or the second terminal device.

19. The network device according to claim 16, wherein the at least one processor is further configured to perform operations including:

receiving first indication information from the terminal device, wherein the first indication information indicates a second packet delay budget of data transmitted on the sidelink.

20. The network device according to claim 16, wherein the at least one processor is further configured to perform operations including:

receiving second indication information from the terminal device, wherein the second indication information indicates a third packet delay budget of data transmitted on the first link.

* * * * *